United States Patent
Cooper

(10) Patent No.: US 10,616,055 B2
(45) Date of Patent: Apr. 7, 2020

(54) HASH BASED DEVICE CONFIGURATION MANAGEMENT

(71) Applicant: ACCENTURE GLOBAL SOLUTIONS LIMITED, Dublin (IE)

(72) Inventor: Christopher R Cooper, Chicago, IL (US)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 260 days.

(21) Appl. No.: 15/913,049

(22) Filed: Mar. 6, 2018

(65) Prior Publication Data

US 2019/0280925 A1 Sep. 12, 2019

(51) Int. Cl.
*H04L 29/06* (2006.01)
*H04L 12/24* (2006.01)
*H04L 9/32* (2006.01)
*H04L 29/08* (2006.01)
*H04W 4/50* (2018.01)

(52) U.S. Cl.
CPC ........ *H04L 41/0816* (2013.01); *H04L 9/3239* (2013.01); *H04L 41/0856* (2013.01); *H04L 41/28* (2013.01); *H04L 63/10* (2013.01); *H04L 67/34* (2013.01); *H04W 4/50* (2018.02)

(58) Field of Classification Search
CPC . H04L 41/0816; H04L 41/0856; H04L 41/28; H04L 9/3239; H04L 63/10; H04L 67/34; H04W 4/50
USPC .......................................................... 726/4
See application file for complete search history.

(56) References Cited

U.S. PATENT DOCUMENTS

| | | | |
|---|---|---|---|
| 6,370,649 B1* | 4/2002 | Angelo | G06F 21/31 235/382 |
| 8,850,547 B1* | 9/2014 | Feeser | H04L 63/0272 726/9 |
| 2007/0277241 A1 | 11/2007 | Repasi et al. | |
| 2008/0016576 A1* | 1/2008 | Ueda | G11B 20/00086 726/26 |
| 2010/0150347 A1* | 6/2010 | Teruyama | H04L 9/0894 380/255 |
| 2012/0011352 A1* | 1/2012 | Shimatani | G06F 21/575 713/1 |
| 2012/0331526 A1* | 12/2012 | Caudle | G06F 21/6209 726/4 |

(Continued)

*Primary Examiner* — Michael S McNally
(74) *Attorney, Agent, or Firm* — Mannava & Kang, P.C.

(57) ABSTRACT

According to an example, with respect to hash based device configuration management, a device configuration status and a device configuration hash value associated with a configuration file for a device may be ascertained. Based on a determination that the device configuration hash value matches an application configuration hash value, an application configuration status for the device may be modified to correspond to the device configuration status. If there is no match, a determination may be made as to whether the device has permission to locally modify the configuration for the device, and if not, a configuration file may be sent to the device to modify the configuration for the device. If the device has permission, the configuration file that is associated with the device configuration hash value may be requested, and a configuration record associated with the device may be updated based on the requested configuration file.

20 Claims, 24 Drawing Sheets

(56) References Cited

U.S. PATENT DOCUMENTS

2014/0380063 A1* 12/2014 Kobayashi ............ H04L 9/3236
713/193
2015/0271679 A1    9/2015 Park et al.
2015/0334248 A1* 11/2015 Yin ................... H04M 15/8083
455/406

* cited by examiner

1200

ASCERTAIN, OVER A NETWORK, A DEVICE CONFIGURATION STATUS OF A DEVICE OF A PLURALITY OF DEVICES THAT INCLUDE INTERNET OF THINGS (IOT) DEVICES, AND A DEVICE CONFIGURATION HASH VALUE ASSOCIATED WITH A CONFIGURATION FILE FOR THE DEVICE
1202

↓

DETERMINE WHETHER THE DEVICE CONFIGURATION HASH VALUE MATCHES AN APPLICATION CONFIGURATION HASH VALUE
1204

↓

MODIFY, BASED ON A DETERMINATION THAT THE DEVICE CONFIGURATION HASH VALUE MATCHES THE APPLICATION CONFIGURATION HASH VALUE, AN APPLICATION CONFIGURATION STATUS FOR THE DEVICE TO CORRESPOND TO THE DEVICE CONFIGURATION STATUS OF THE DEVICE
1206

↓

DETERMINE, BASED ON A DETERMINATION THAT THE DEVICE CONFIGURATION HASH VALUE DOES NOT MATCH THE APPLICATION CONFIGURATION HASH VALUE, WHETHER THE DEVICE HAS PERMISSION TO LOCALLY MODIFY THE CONFIGURATION FOR THE DEVICE
1208

↓

BASED ON A DETERMINATION THAT THE DEVICE DOES NOT HAVE PERMISSION TO LOCALLY MODIFY THE CONFIGURATION FOR THE DEVICE, SEND, OVER THE NETWORK, A CONFIGURATION FILE TO THE DEVICE TO MODIFY, BASED ON THE SENT CONFIGURATION FILE, THE CONFIGURATION FOR THE DEVICE
1210

↓

BASED ON A DETERMINATION THAT THE DEVICE HAS PERMISSION TO LOCALLY MODIFY THE CONFIGURATION FOR THE DEVICE, REQUEST, OVER THE NETWORK, THE CONFIGURATION FILE THAT IS ASSOCIATED WITH THE DEVICE CONFIGURATION HASH VALUE AND IS USED BY THE DEVICE TO MODIFY THE CONFIGURATION FOR THE DEVICE, AND UPDATE, UPON RECEIPT, OVER THE NETWORK, OF THE REQUESTED CONFIGURATION FILE, A CONFIGURATION RECORD ASSOCIATED WITH THE DEVICE BASED ON THE REQUESTED CONFIGURATION FILE
1212

*FIG. 12*
*(CONT.)*

HASH BASED DEVICE CONFIGURATION MANAGEMENT

BACKGROUND

A device may include a configuration that specifies various attributes of the device. For example, for a device that includes a sensor, a configuration may include a frequency at which the sensor is to read or transmit data. According to another example, the sensor may include a type of data that may be read or transmitted. A configuration may be described to include any operational attribute of a device. A device may be one of a plurality of devices that may be utilized to collect or provide information. In this regard, the plurality of devices may be part of an Internet of Things (IoT), e.g., the plurality of devices may form a network of physical devices. The physical devices may include, for example, automobiles, home appliances and other such devices. The devices may be embedded with features such as sensors, electronics, executable software code, and actuators. Further, the devices may include connectivity that provides the ability to interconnect and exchange data.

BRIEF DESCRIPTION OF DRAWINGS

Features of the present disclosure are illustrated by way of examples shown in the following figures. In the following figures, like numerals indicate like elements, in which

FIG. 12 illustrates a flowchart of a method for implementing a hash based device configuration management, according to an example of the present disclosure.

DETAILED DESCRIPTION

Figure 1:
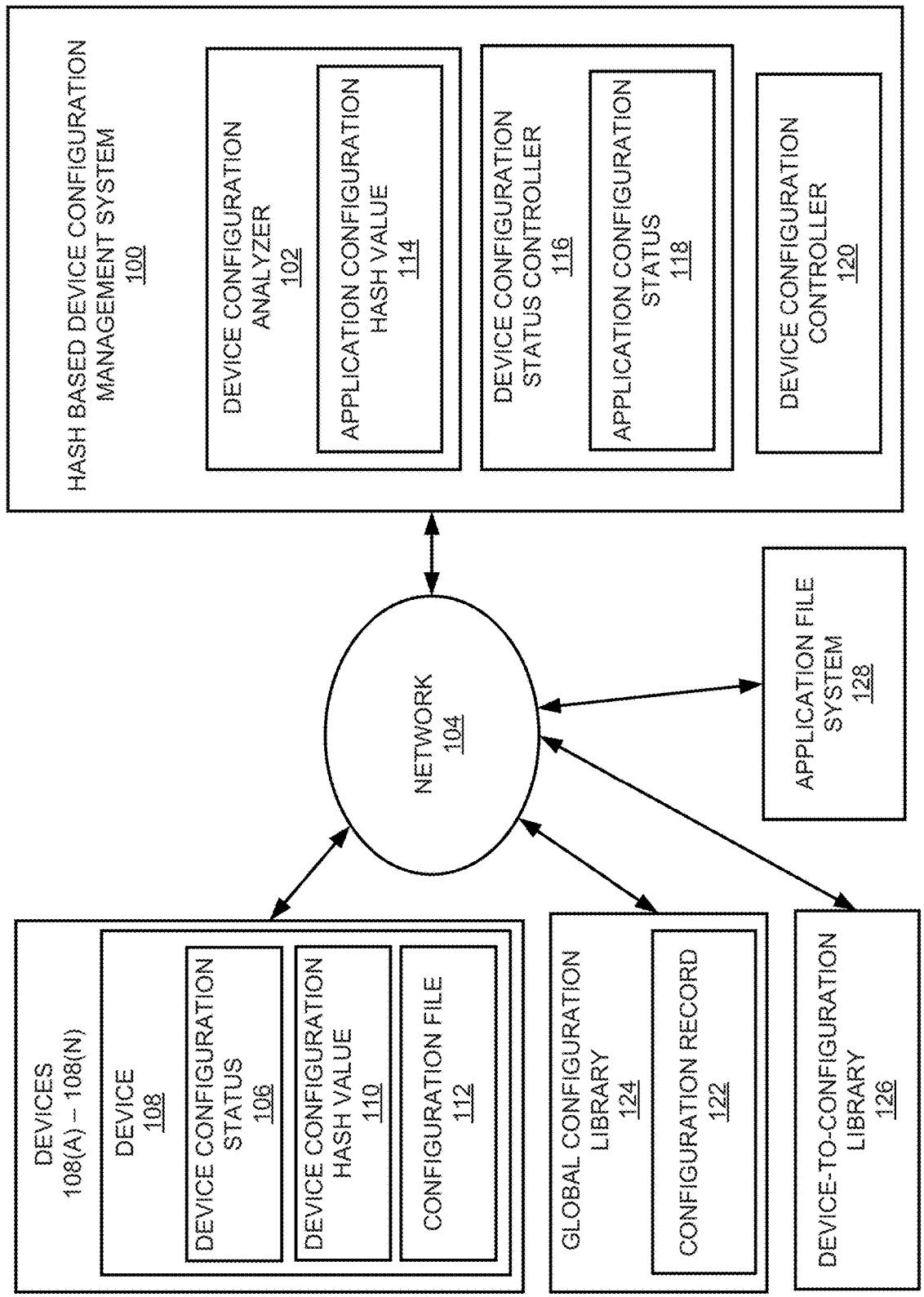
FIG. 1 illustrates an architecture of a hash based device configuration management system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Hash based device configuration management systems, methods for implementing a hash based device configuration management, and non-transitory computer readable media having stored thereon machine readable instructions for hash based device configuration management are disclosed herein. The systems, methods, and non-transitory computer readable media disclosed herein provide for the management of configurations for a population of Internet of Things (IoT) devices. In this regard, the managed configurations may be referenced by using, for example, a Secure Hash Algorithm 1 (SHA-1) hash of the configuration file. A syncing mechanism may be utilized to update a configuration for a connected device if it is determined that the configuration has been corrupted or erased.

With respect to configuration management for devices, industries may utilize hundreds of thousands, and often millions of IoT devices. Management of such devices may be technically challenging in that each device may include a unique configuration. For example, for devices that include sensors disposed at different locations, each sensor may include a unique configuration corresponding to a location. For example, each sensor may include a unique data transmission rate and/or time corresponding to a location. Alternatively, even if the devices are clustered into fleets of devices, such fleets may include unique configurations that may need to be uniquely managed. It may also be technically challenging to manage configurations of devices as the management may depend on factors such as wireless coverage strength associated with each device, a power state of each device, whether a device has been physically tampered with, etc. In this regard, when such large volumes of devices are to be managed, such factors may add technical complexities to the management of such devices. For example, it is technically challenging to efficiently manage all of the different configurations of the devices considering all of the potential variables.

In order to address at least the aforementioned technical challenges with respect to configuration management of devices, such as IoT devices, the systems, methods, and non-transitory computer readable media disclosed herein provide a single library with a single copy of each unique device configuration to manage a plurality of IoT devices. The systems, methods, and non-transitory computer readable media disclosed herein provide for the secure abstraction of a configuration file itself from the configuration management process, until the configuration file is needed to be sent to a device. The systems, methods, and non-transitory computer readable media disclosed herein provide for deployment of a single configuration across a fleet of IoT devices. Further, the systems, methods, and non-transitory computer readable media disclosed herein provide for reduction in telecommunications bandwidth utilization by limiting scenarios in which a full configuration is sent to a device or is received from a device. For example, instead of the need to send a full configuration file to a device, or to receive a full configuration file from a device, a technical analysis may be performed to determine whether the full configuration file needs to be sent to or received from a device. Yet further, aspects such as wireless coverage strength, power state of a device, etc., may be analyzed to determine whether a configuration file is to be sent to a device. The systems, methods, and non-transitory computer readable media disclosed herein may also be implemented to replace corrupt configurations on a device, to re-synchronize a configuration with a device in the event of a technical or connectivity error, and to maintain a configuration status of all devices. Yet further, the systems, methods, and non-transitory computer readable media disclosed herein provide for automation (e.g., without human intervention) of the processes by which the configurations are managed. This automation allows for larger populations of IoT devices to be used with an increasing amount of variance. With the large number of IoT devices, corrupted configurations and communication failures may be likely. In this regard, the systems, methods, and non-transitory computer readable media disclosed herein provide for automated restoration and/or resetting of the corrupt and/or failed configurations, and may do so in a manner that addresses the technical challenges of transmitting an entire configuration to the devices when such may not be needed, conserving network bandwidth (and in particular cases, cellular network bandwidth).

According to examples disclosed herein, the systems, methods, and non-transitory computer readable media disclosed herein may provide for device-level configuration management in that a device may retrieve configuration files from the system, and apply the configurations. The device may send a confirmation message to the system with status of configuration, along with a device configuration hash value (e.g., a SHA-1 value) of the configuration. Further, the device may not send the configuration file itself or any identifiable information other than configuration's hash value. The use of hash values and more particularly hashes in the systems, methods, and non-transitory computer readable media disclosed herein addresses another technical problem—network security. The use of hashes allows the systems, methods, and non-transitory computer readable media disclosed herein to detect whether a configuration may have been compromised.

According to examples disclosed herein, the systems, methods, and non-transitory computer readable media disclosed herein may provide for application level syncing in that an application (e.g., the system) may accept the configuration status and hash from the device. The application may accept the configuration status and hash value on record for the device. If the values match, no action may be taken and application's status for that device configuration may be updated. If the values do not match and the device does not have permission to update the configuration locally, the configuration file may be resent to the device. If the values do not match and the device does have permission to update the configuration locally, the application may update its records for that device and request the file itself from the device.

According to examples disclosed herein, the systems, methods, and non-transitory computer readable media disclosed herein may provide a global configuration library that includes configuration file type (if needed), and a hash (e.g., a SHA-1) for each device. Further, all records in the global configuration library may map to the application's file system, where the files themselves are stored. A device-to-configuration library may store all IoT devices associated with the application (e.g., the system), and a reference to the global configuration library for each configuration file on the device.

According to examples disclosed herein, if a third party application is to send a configuration to a device, the third party application may pass the hash value of the configuration. The systems, methods, and non-transitory computer readable media disclosed herein may provide for the retrieval of the configuration file from the file system and send the retrieved configuration file to the device. Further, notification messages may be sent to third party applications as needed, when the configuration status is updated from the device.

In some examples, elements of the hash based device configuration management system may be machine readable instructions stored on a non-transitory computer readable medium. In this regard, the hash based device configuration management system may include or be a non-transitory computer readable medium. In some examples, the elements of the hash based device configuration management system may be hardware or a combination of machine readable instructions and hardware.

FIG. 1 illustrates an architecture of a hash based device configuration management system 100 (hereinafter "system 100"), according to an example of the present disclosure.

Referring to FIG. 1, the system 100 may include a device configuration analyzer 102 that is executed by at least one hardware processor (e.g., the hardware processor 1102 of FIG. 11, and/or the hardware processor 1304 of FIG. 13) to ascertain, over a network 104, a device configuration status 106 of a device 108 of a plurality of devices 108(*a*)-108(*n*), and a device configuration hash value 110 associated with a configuration file 112 for the device 108.

According to examples disclosed herein, the device 108 may include an Internet of Things (IoT) device. Similarly, the devices 108(*a*)-108(*n*) may include IoT devices.

According to examples disclosed herein, in FIG. 1, the network 104 is disclosed between the system 100 and the devices 108(*a*)-108(*n*) for illustrative purposes. In this regard, the network 104 may be expanded or reduced to interconnect other devices, entities (e.g., applications), etc.

The device configuration analyzer 102 may determine whether the device configuration hash value 110 matches an application configuration hash value 114.

A device configuration status controller 116 that is executed by the at least one hardware processor (e.g., the hardware processor 1102 of FIG. 11, and/or the hardware processor 1304 of FIG. 13) may modify, based on a determination that the device configuration hash value 110 matches the application configuration hash value 114, an application configuration status 118 for the device 108 to correspond to the device configuration status 106 of the device 108.

According to examples disclosed herein, the device configuration hash value 110 may be a Secure Hash Algorithm 1 (i.e., SHA-1) value. Similarly, the application configuration hash value 114 may be SHA-1. Of course, it should be understood that other hash algorithms could be employed, such as Secure Hash Algorithm 2 (SHA-2) or BLAKE2.

A device configuration controller 120 that is executed by the at least one hardware processor (e.g., the hardware processor 1102 of FIG. 11, and/or the hardware processor 1304 of FIG. 13) may determine, based on a determination that the device configuration hash value 110 does not match the application configuration hash value 114, whether the device 108 has permission to locally modify the configuration for the device 108.

Based on a determination that the device 108 does not have permission to locally modify the configuration for the device 108, the device configuration controller 120 may send, over the network 104, a configuration file to the device 108 to modify, based on the sent configuration file, the configuration for the device 108.

Based on a determination that the device 108 has permission to locally modify the configuration for the device 108, the device configuration controller 120 may request, over the network 104, the configuration file (e.g., the configuration file 112 or another configuration file) that is associated with the device configuration hash value 110 and is used by the device 108 to modify the configuration for the device 108. Further, the device configuration controller 120 may update, upon receipt, over the network 104, of the requested configuration file, a configuration record 122 associated with the device 108 based on the requested configuration file.

According to examples disclosed herein, further to the sending, over the network 104, the configuration file to the device 108 to modify, based on the sent configuration file, the configuration for the device 108, the device configuration analyzer 102 may ascertain, from the device 108 and over the network 104, the device configuration status 106 of the device 108. That is, the device configuration analyzer 102 may check the updated status of the device 108. In this regard, the device configuration analyzer 102 may ascertain the device configuration hash value 110 associated with the configuration file that is used to modify the configuration for the device 108. The device configuration analyzer 102 may determine whether the device configuration hash value 110 associated with the configuration file that is used to modify the configuration for the device 108 matches the application configuration hash value 114. Further processing with respect to the device configuration analyzer 102 may proceed as described above.

According to examples disclosed herein, the device configuration analyzer 102 may determine whether the device configuration hash value 110 matches the application configuration hash value 114 by accessing, over the network 104, a global configuration library 124 that stores application configuration hash values including the application configuration hash value 114. The application configuration hash values may be mapped to associated configuration files. The device configuration analyzer 102 may access, over the network 104, a device-to-configuration library 126 that stores a reference to the global configuration library 124 for each configuration file on a device 108. The device configuration analyzer 102 may ascertain, based on the access to the global configuration library 124 and the device-to-configuration library 126, the application configuration hash value 114 associated with the device 108 for which the device configuration hash value 110 is ascertained.

According to examples disclosed herein, the device configuration controller 120 may ascertain, over the network 104, a request (e.g., from another application, or an entity generally) to update the configuration for the device 108. The device configuration controller 120 may ascertain, over the network 104, another device configuration hash value associated with the request to update the configuration for the device 108. The device configuration controller 120 may retrieve, over the network 104, a configuration file (e.g., from an application file system 128 that stores configuration files including the configuration file 112) associated with the another device configuration hash value. The device configuration controller 120 may send, to the device 108 and over the network 104, the retrieved configuration file associated with the another device configuration hash value to update the configuration for the device 108.

According to examples disclosed herein, the device configuration analyzer 102 may notify, over the network 104, an entity (e.g., the other application) associated with the request to update the configuration for the device 108, the device configuration status 106 of the device 108 upon completion of the update, based on the retrieved configuration file associated with the another device configuration hash value, of the configuration for the device 108.

According to examples disclosed herein, the device configuration analyzer 102 may receive, over the network 104, a request from an entity (e.g., another application) for the configuration file (e.g., the configuration file 112, or another configuration file) that is used by the device 108. The device configuration analyzer 102 may determine, based on the received request from the entity for the configuration file that is used by the device 108, whether the configuration file that is used by the device 108 is known (e.g., the configuration file 112) or unknown (e.g., another configuration file). Based on a determination that the configuration file that is used by the device 108 is known, the device configuration analyzer 102 may generate, for the entity, a response that includes an indication of the configuration file that is used by the device 108.

According to examples disclosed herein, the device configuration analyzer 102 may ascertain, based on a determination that the configuration file that is used by the device 108 is unknown, from the device 108, the configuration file that is used by the device 108. Further, the device configuration analyzer 102 generate, for the entity, a response that includes an indication of the ascertained configuration file that is used by the device 108.

According to examples disclosed herein, further to the sending, over the network 104, the configuration file to the device 108 to modify, based on the sent configuration file, the configuration for the device 108, the device configuration analyzer 102 may determine whether the sent configuration file is of a same file type present in a command queue for the device 108. Based on a determination that the sent configuration file is of the same file type present in the command queue for the device 108, the device configuration analyzer 102 may determine a command status of a command associated with the sent configuration file, and implement, based on the determined command status, a retry operation with respect to the command queue for the device 108 for the sent configuration file.

According to examples disclosed herein, further to the sending, over the network 104, the configuration file to the device 108 to modify, based on the sent configuration file, the configuration for the device 108, the device configuration analyzer 102 may determine whether the sent configuration file is of a same file type present in a command queue for the device. Further, based on a determination that the sent configuration file is not of the same file type present in the command queue for the device 108, the device configuration analyzer 102 may implement a retry operation with respect to the command queue for the device 108 for the sent configuration file.

Figure 2:
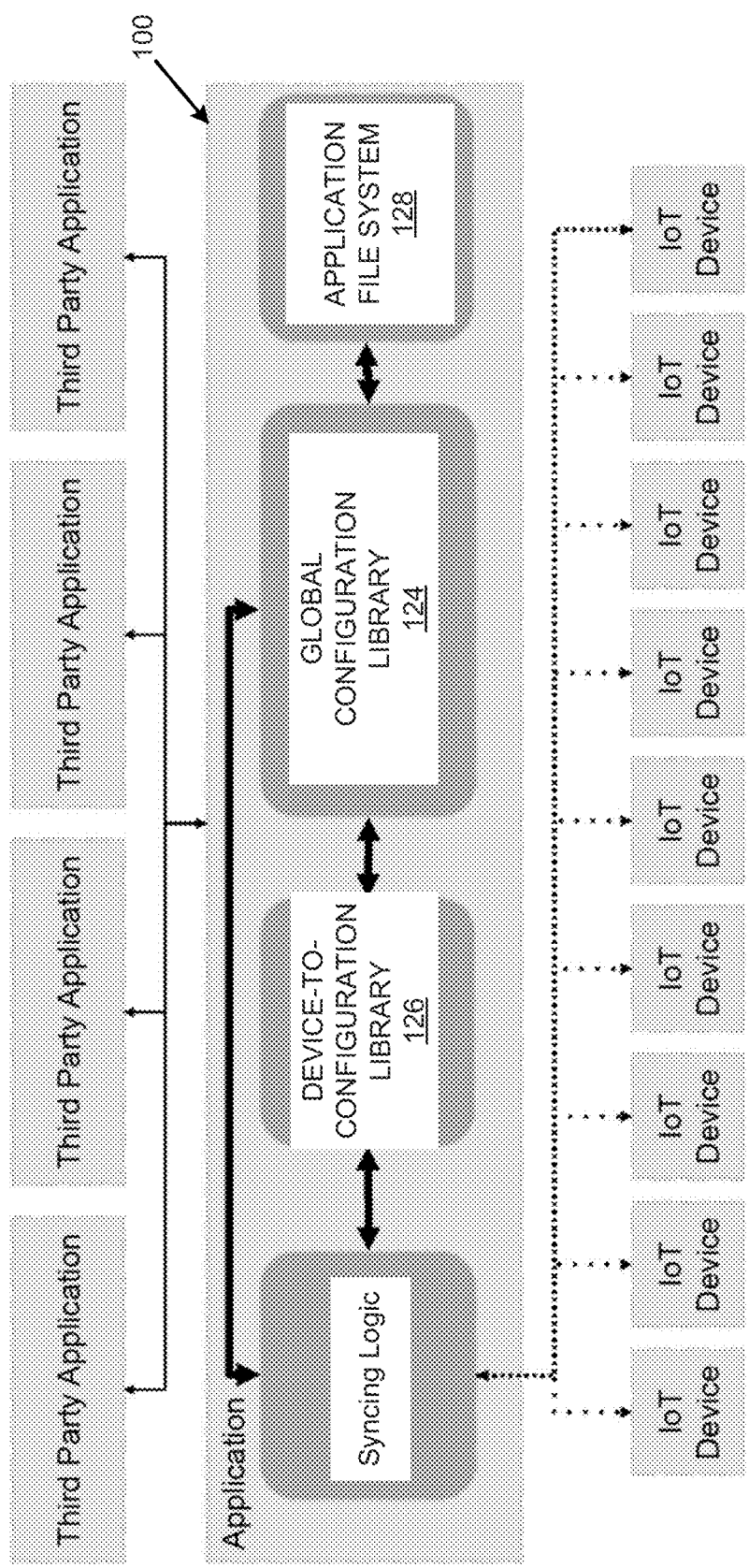
FIG. 2 illustrates further details of the architecture of the hash based device configuration management system of FIG. 1, according to an example of the present disclosure.

FIG. 2 illustrates further details of the architecture of the system 100, according to an example of the present disclosure.

Referring to FIG. 2, the system 100 may include the global configuration library 124, the device-to-configuration library 126, and the application file system 128, each interconnected as disclosed herein with respect to IoT devices (e.g., devices 108(*a*)-108(*n*)), as well as third party applications. The third party applications may provide and/or request information such as configuration information and/or configuration files from the IoT devices. The transfer of such configuration information and/or configuration files may be managed by the system 100 as disclosed herein.

Figure 3:
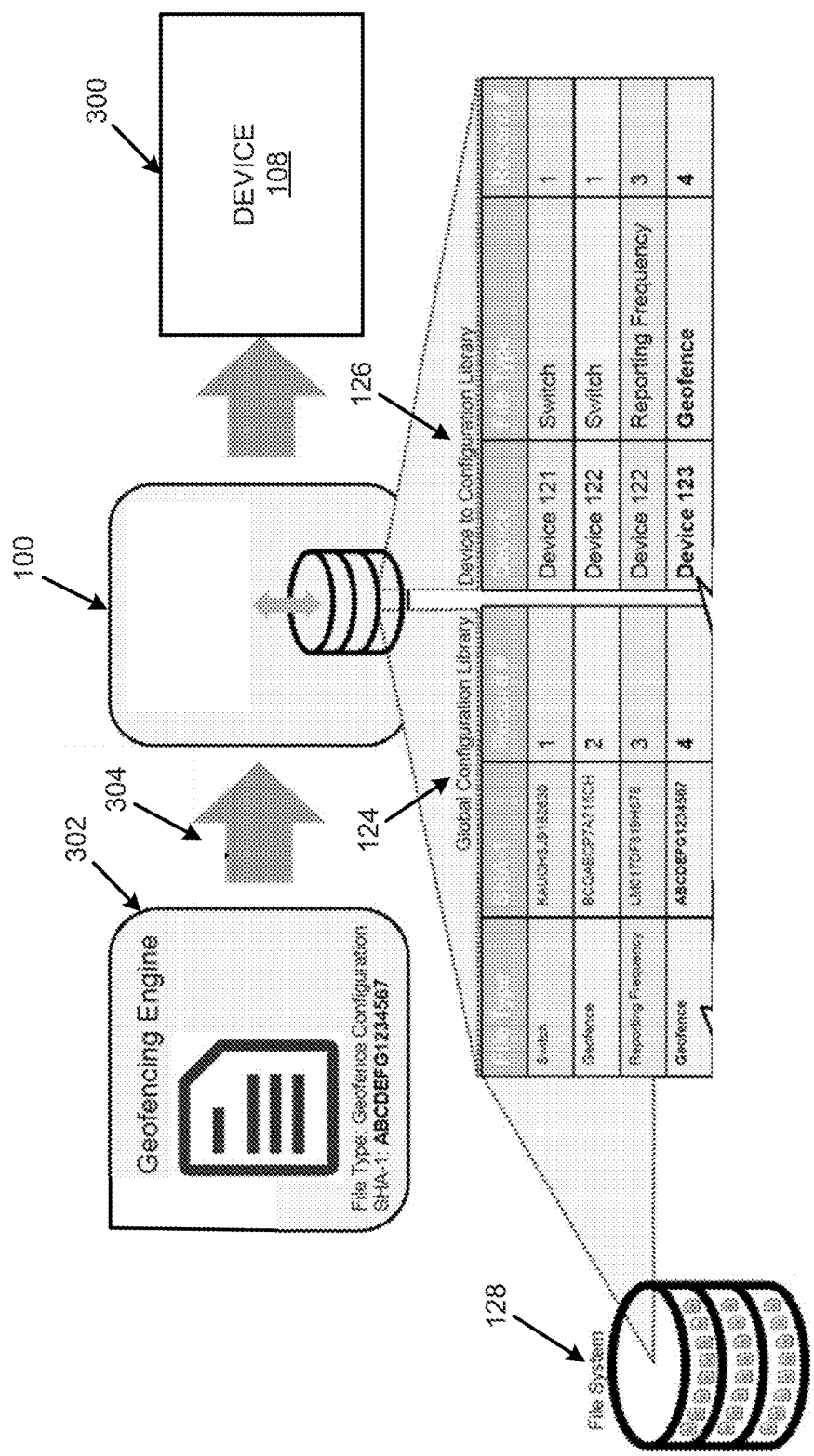
FIG. 3 illustrates further details of the architecture of the hash based device configuration management system of FIG. 1, including a global configuration library and a device-to-configuration library, according to an example of the present disclosure.

FIG. 3 illustrates further details of the architecture of the system 100, including a global configuration library and a device-to-configuration library, according to an example of the present disclosure.

Referring to FIG. 3, examples of the global configuration library 124, the device-to-configuration library 126, and the application file system 128 are illustrated. The global configuration library 124 may include information such as a configuration file type (e.g., switch, geofence, etc.), associated hash values (e.g., SHA-1 value KAUCHSJ9182630, etc.), and record identification numbers for the configuration files (e.g., 1, 2, 3, etc.). Similarly, the device-to-configuration library 126 may include information such as the device identification (e.g., Device 121, Device 122, etc.), configuration file type (e.g., switch, geofence, etc.), and record identification numbers for the configuration files (e.g., 1, 2, 3, etc.). In this manner, the entries of the device-to-configuration library 126 may store a reference to the global configuration library 124 for each configuration file on a device 108. Further, for the example device illustrated at 300, at 302, a configuration may be created in a third party application. The configuration may include a geofencing engine with a file type of geofence configuration, and a hash value of ABCDEFG1234567 (in this example, a SHA-1 value). At 304, the third party application may inform the system 100 to send the configuration to the device at 300. At the global configuration library 124, if needed, a new record may be added to the global configuration library 124. Further, at the device-to-configuration library 126, the configuration and the device (e.g., Device 123) may be associated. At the device at 300, the configuration may be queued as disclosed herein for the device.

Figure 4:
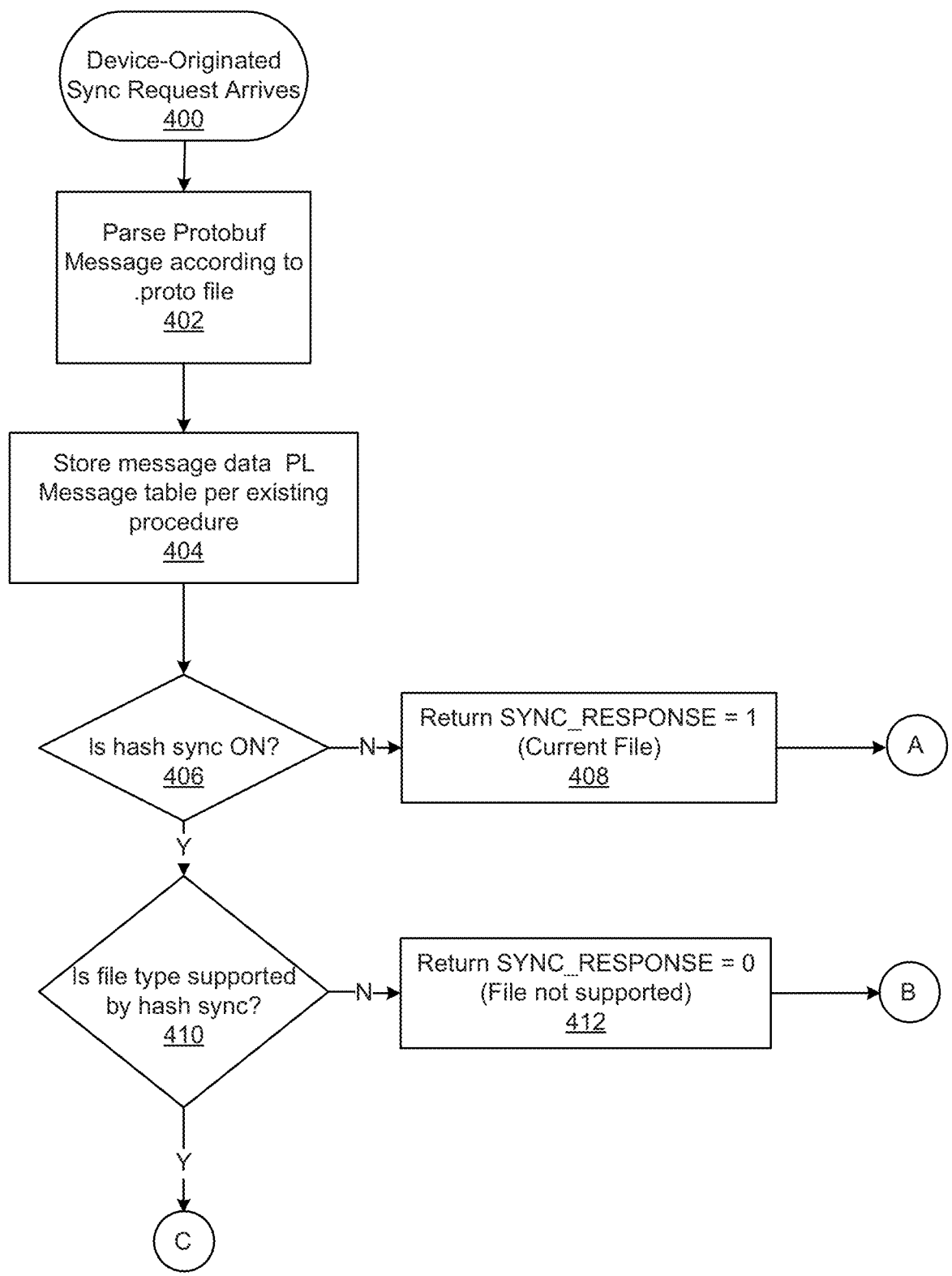
FIG. 4 illustrates a device configuration request flow to illustrate operation of the hash based device configuration management system of FIG. 1, according to an example of the present disclosure.
Figure 4:
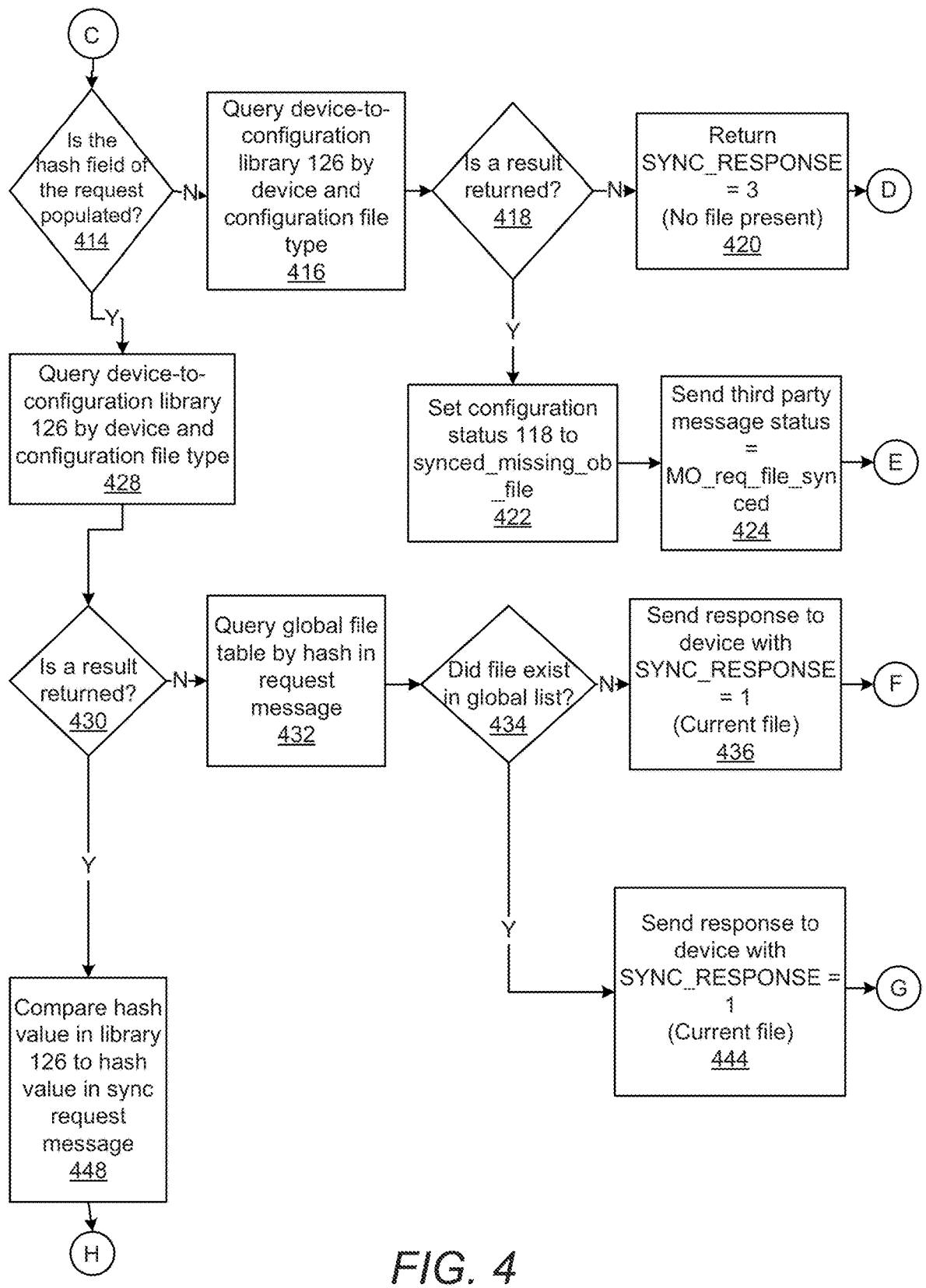
Figure 4:
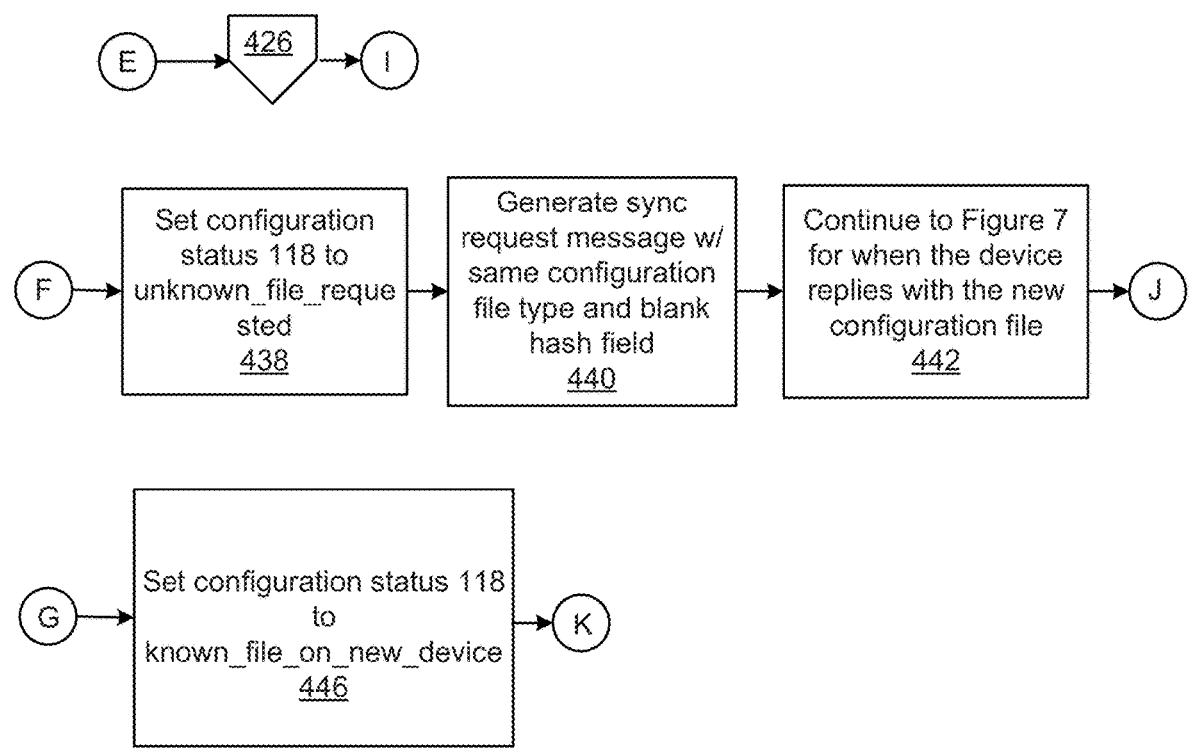
Figure 4:
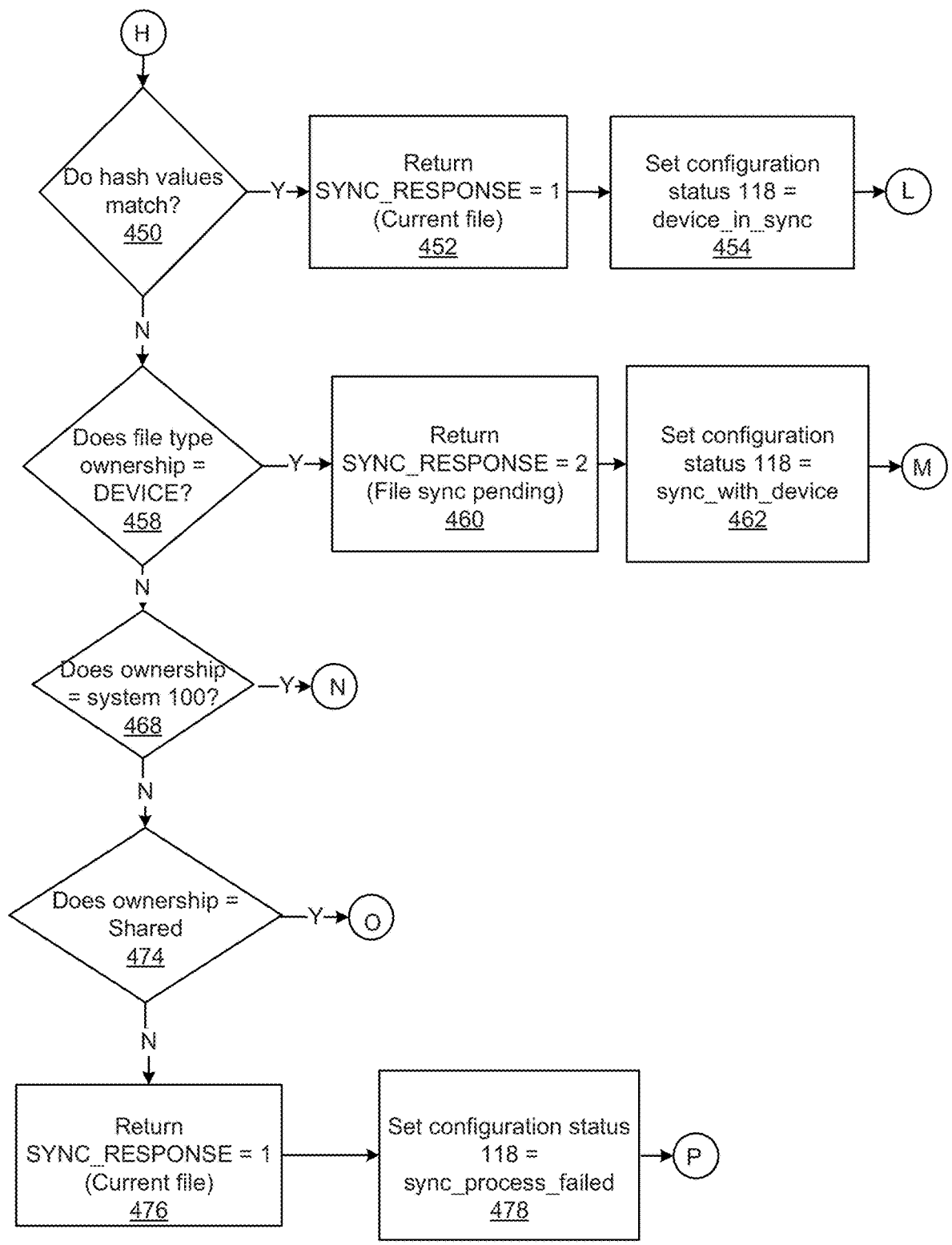
Figure 4:
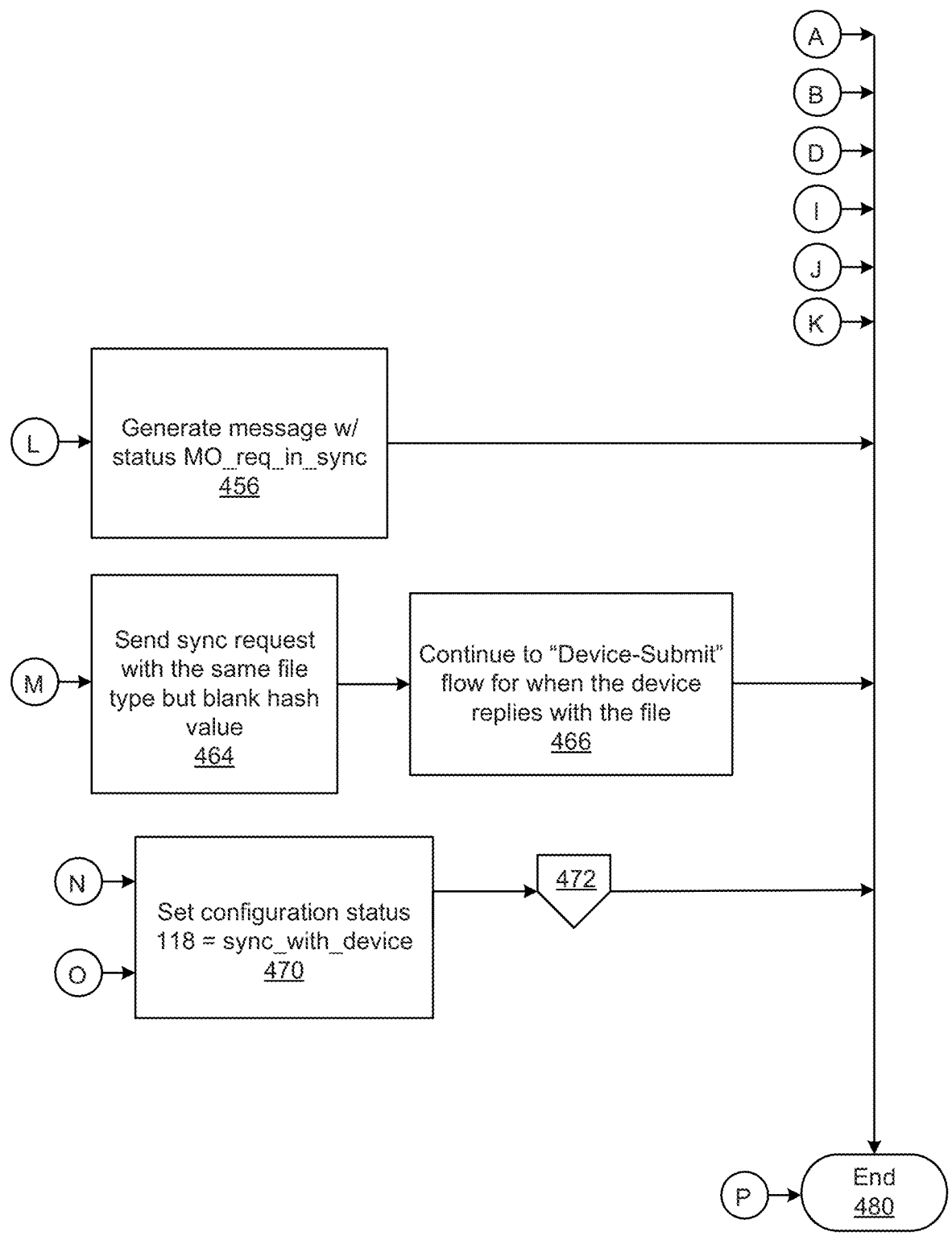

FIG. 4 illustrates a device configuration request flow to illustrate operation of the system 100, according to an example of the present disclosure.

The device configuration request flow may be utilized when a device sends the system 100 a new configuration file status message.

With respect to FIGS. 4-10, possible statuses from the device may include "FILE_NOT_SUPPORTED=0" where the device does not know how to handle the configuration file in question, "CURRENT_FILE=1" where the system 100 and the device are in agreement, "FILE_SYNC_PENDING=2" where something needed to be synced and an incoming request is expected, "NO_FILE_PRESENT=3" where the configuration file that was requested does not exist on the device or in the system 100, "FILE_DELETE_SUCCESS=4", and "FILE_SYNC_INTERNAL_ERROR=5" where an error occurred.

Further, possible statuses recorded in the system 100 may include a "Synced_missing_ob_file" where "ob" represents a device, "unknown_file_requested" where an unknown configuration file may be requested by a device, "known_file_on_new_device", "device_in_sync" which corresponds to device status="CURRENT_FILE", "Sync_with_device" which corresponds to device status="FILE_SYNC_PENDING", and "Sync_process_failed" which may represent a fail out status.

Referring to FIG. 4, at block 400, a device-originated sync request may be received. In this regard, parameters in the device status message may include the "File Type Number" of the configuration file, request type "REQUEST_FILE or DELETE_FILE", and Secure Hash Algorithm 1 (SHA-1) that represents the hash type of the configuration file type being processed.

At block 402, the associated protobuf sync request message may be parsed according to a proto file definition.

At block 404, the message data may be stored in a separate table by the device for later reference.

At block 406, a determination may be made as to whether the hash sync process is on. If the sync process is off, the sync process will not be used. The sync process may not be used if there is a critical error or flaw in the process.

At block 408, based on a determination at block 406 that the hash sync process is not on, a "SYNC_RESPONSE=1 (CURRENT_FILE)" may be returned to the device. When this status is received by the device, it should stop the sync process.

At block 410, based on a determination at block 406 that the hash sync process is on, a determination may be made as to whether the file type is supported by hash sync process. In this regard, certain legacy configuration file types designed and built before the hash sync process was built may not be supported.

At block 412, based on a determination at block 410 that the file type is not supported by the hash sync process, a "SYNC_RESPONSE=0 (FILE_NOT_SUPPORTED)" may be returned to the device. This status may inform the device that the configuration file type it is requesting is not supported by the hash sync process. This status may further stop the sync process.

At block 414, a determination may be made as to whether the hash field of the request is populated. In this regard, a determination of yes (Y) means that a configuration file type exists on the device, and a determination of no (N) means that a configuration file type does not exist on the device.

With respect to blocks 416-426 discussed below, these blocks may represent a flow where a device (e.g., device 108) requests an existing configuration file from the system 100. In this regard, the device may have lost its configuration file, corrupted its local copy of the configuration file, or only received a partial copy of the configuration file due to connection disturbances with the system 100, and thus requests a new copy. The device also may need to 're-sync' with the system 100 after it has been placed on a new piece of equipment. Further, the device may request a configuration file that it actually does not need.

At block 416, the device-to-configuration library 126 may be queried by device and configuration file type. The purpose of this query is to determine whether the device already has a configuration of that type.

At block 418, a determination may be made as to whether a result is returned. In this regard, a yes (Y) may indicate that the system 100 has a copy of the configuration in the application file system 128 that is missing on the device, and a no (N) may indicate that the configuration being requested by the device does not exist in the system 100 or on the device.

At block 420, based on a determination at block 418 that no result is returned (e.g., no configuration file exists on the device or in the application file system 128), a "SYNC_RESPONSE=3" (no file present) may be returned to the device. This sync response may end the sync process.

At block 422, based on a determination at block 418 that a result is returned (e.g., the system 100 has a configuration file that is missing on the device), "sha_sync.status" may be set to "synced_missing_ob_file" which means that a configuration was missing on the device but it was restored by the sync process. In this regard "ob" may represent a device, and the "synced_missing_ob_file" may represent a status recorded in the system 100.

At block 424, a message status=MO_req_file_synced may be created, where the associated file type may represent the 'sync status message' type which informs third party applications of the status of a sync process.

At block 426, the configuration file that was identified at block 416 may be sent to the device, and the sync process may end.

At block 428, the device-to-configuration library 126 relationship by may be queried by device and configuration file type.

At block 430, a determination may be made as to whether a result is returned. In this regard, a yes (Y) may indicate that the system 100 and the device have a record for that configuration type on that device (but possibly not the same exact configuration file), and a no (N) may indicate that the device has a configuration file type that the system 100 does not have.

With respect to blocks 432-446 discussed below, these blocks may represent a flow where the system 100 learns that a device has a previously-unknown configuration file. In this regard, the configuration file may have been uploaded locally. If the configuration file is completely new, the system 100 may request a copy in order to add it to the device-to-configuration library 126, the global configuration library 124, and the application file system 128.

At block 432, the global configuration library 124 may be queried by the hash algorithm in the request message to determine whether this configuration file already exists in the global configuration library 124.

At block 434, a determination may be made as to whether the configuration file exists the global configuration library 124.

At block 436, based on a determination at block 434 that the configuration file does not exist in the global configuration library 124, a "SYNC_RESPONSE=1" (e.g., current file) may be returned. This may inform the device that it has the correct configuration, since the system 100 does not have a record of that configuration file in the global configuration library 124. This also means that is a completely new and unique configuration file may be applied locally at the device. This new configuration file may be requested from the device by the system 100 in block 440.

At block 438, the configuration status 118 may be set equal to "unknown_file_requested". The "unknown_file_requested" may represent a status recorded by the system 100 for a request by a device of a completely new configuration file.

At block 440, the sync request message may be generated with the same configuration file type and a blank hash field. The generation of the sync request message may prompt the device to send the configuration file to the system 100.

Figure 7:
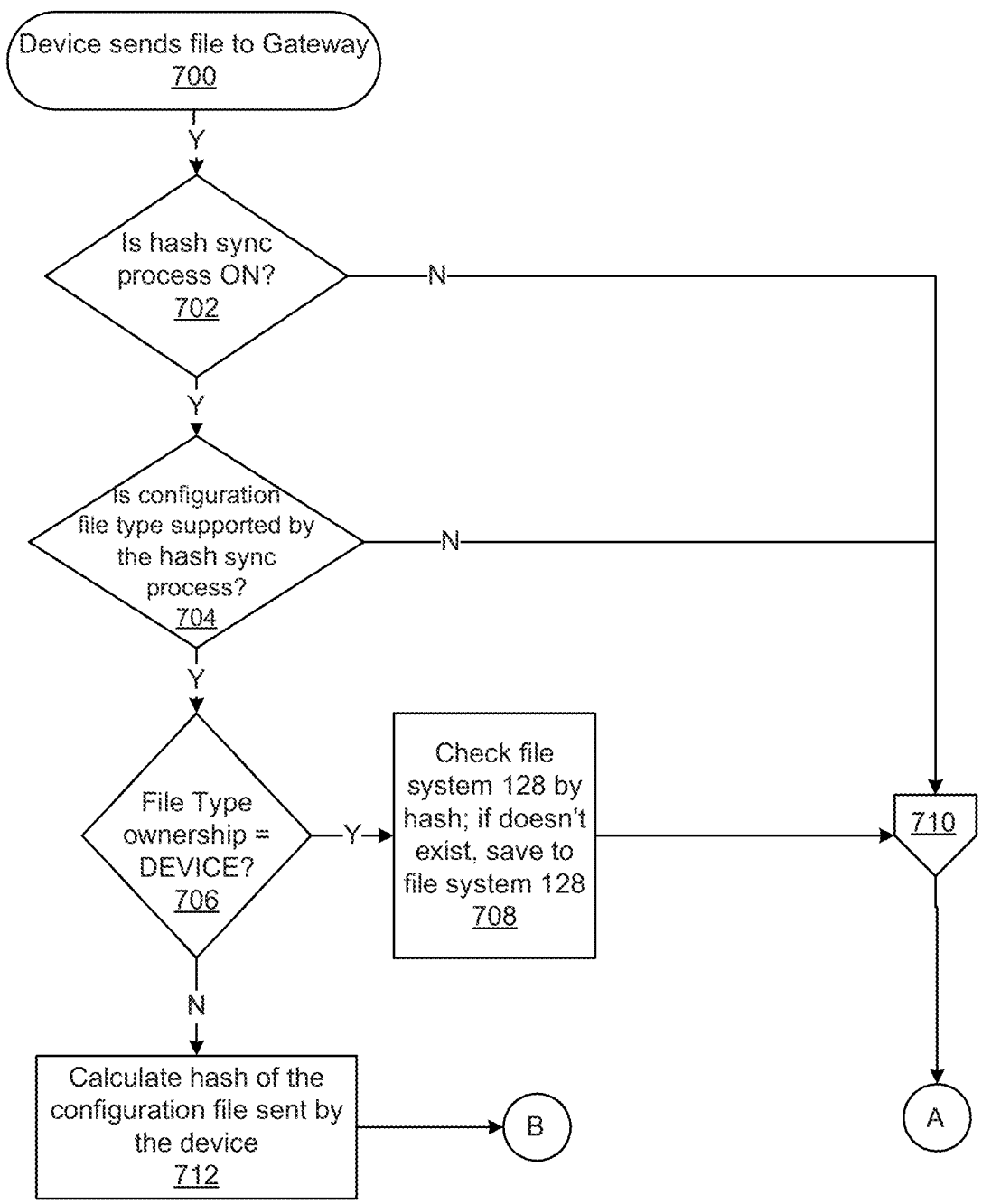
FIG. 7 illustrates a device originated flow to illustrate operation of the hash based device configuration management system of FIG. 1, according to an example of the present disclosure.
Figure 7:
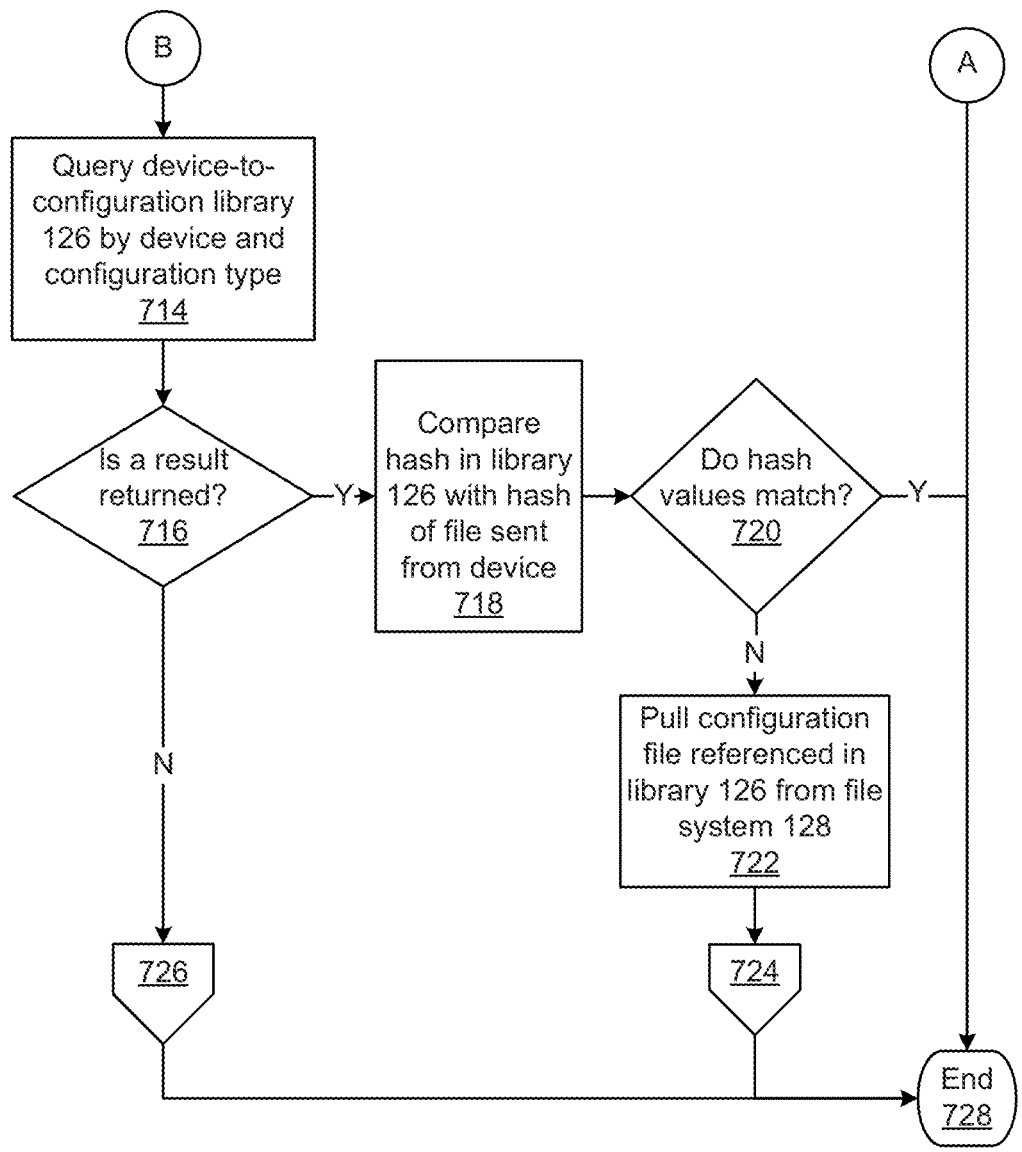

At block 442, processing may continue to the "Device-Submit" flow for when the device replies with the configuration file, as shown in FIG. 7.

At block 444, based on a determination at block 434 that the configuration file exists in the global configuration library 124, a "SYNC_RESPONSE=1" (e.g., current file) may be returned to the device.

At block 446, the configuration status 118 may be set equal to "known_file_on_new_device". This means that an existing configuration file was discovered on a new device. In this regard, the "known_file_on_new_device" may represent a status recorded by the system 100.

At block 448, the hash value in the device-to-configuration library 126 may be compared to the hash value in the message from the device.

At block 450, a determination may be made as to whether the hash values match.

With respect to blocks 452-456 discussed below, these blocks may represent a flow where the system 100 confirms that device is synced correctly (e.g., no action taken, the system 100 indicates to the device that the system 100 and the device are in sync).

At block 452, based on a determination at block 450 that the hash values match (e.g., the device and the system 100 are in sync), a "SYNC_RESPONSE=1" (current file) may be returned.

At block 454, the configuration status 118 may be set to "device_in_sync" to create a record in the device configuration status controller 116 that the system 100 and the device are in sync. In this regard, the "device_in_sync" may correspond to a response status of "CURRENT_FILE" returned to the device.

At block 456, a 'sync status message' type which informs third parties the status of a configuration or a device may be generated with status "MO_req_in_sync", which may tell third parties that the device requested an updated configuration but the device already had the correct configuration.

With respect to blocks 458-466 discussed below, these blocks may represent a flow where a device (e.g., the device 108) and the system 100 are not in sync, but the device owns the configuration type. The configuration type owner (e.g., the system 100, the device 108, or shared) may have permission to update that type of configuration. In regard to device ownership, the configuration may be uploaded locally onto the device 108, the system 100 may confirm the out-of-sync condition with the device, and then request the new configuration for the system 100 to store in application file system 128.

At block 458, a determination may be made as to whether the device has ownership of the configuration type.

At block 460, based on a determination at block 458 that the device has ownership of the configuration type, a "SYNC_RESPONSE=2" (file sync pending) may be returned.

At block 462, the configuration status 118 may be set to equal to "sync_with_device", which creates a record in the application configuration status 118 that the application must request the configuration file from the device. In this regard, the "sync_with_device" in the application configuration status 118 may correspond to a response to the device with a status of "FILE_SYNC_PENDING".

At block 464, a sync request may be sent from the system 100 to the device with the same configuration file type but with a hash value. The blank hash value may prompt the device to reply with its local copy of the configuration file.

At block 466, further processing may continue to the "Device-Submit" flow for when the device replies with the configuration file.

At block 468, a determination may be made as to whether the ownership is equal to the system 100. If the system 100 has ownership of a configuration, then the configuration may only be updated by the system 100. If the answer to block 468 is yes, the system 100 may assert its permissions over the device by re-sending the configuration file in block 472.

With respect to block 470 discussed below, this block may represent a flow where the device (e.g., device 108) and the system 100 are not in sync, and the system 100 has ownership of the configuration type. In this regard, the system 100 may queue the configuration file that it has stored in the application file system 128 for that device and that configuration type (as recorded in the device-to-configuration library 126).

At block 470, based on a determination at block 468 that the mastership is equal to the system 100, the configuration status 118 may be set to equal to "sync_with_device".

At block 472, the configuration file identified at block 428 may be queued to the device (e.g., the device 108).

At block 474, a determination may be made as to whether the ownership is shared. Shared ownership means that both the system 100 and the device have permission to update the configuration.

At block 476, based on a determination at block 474 that the ownership is not equal to shared, a "SYNC_RESPONSE=1" (current file) may be returned in order to stop the sync process on the device since the process has failed in the system 100.

At block 478, the configuration status 118 may be set equal to "sync_process_failed" in the application configuration status 118. In this regard, the "sync_process_failed" may represent to a fail out status of the sync process where there was a logical or procedural error.

At block 480, processing with respect to the device configuration request flow may be completed.

Figure 5:
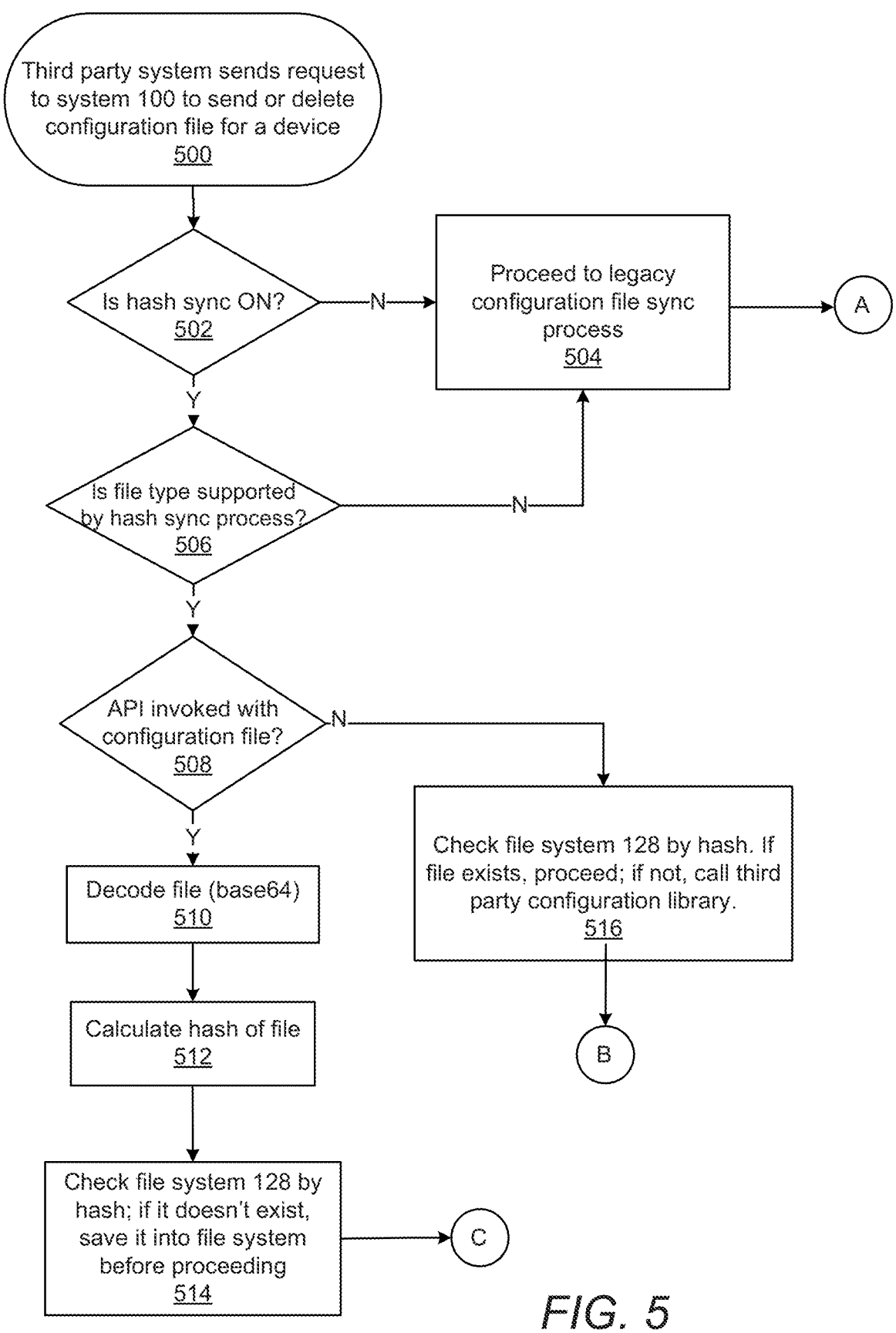
FIG. 5 illustrates a third party request flow to illustrate operation of the hash based device configuration management system of FIG. 1, according to an example of the present disclosure.
Figure 5:
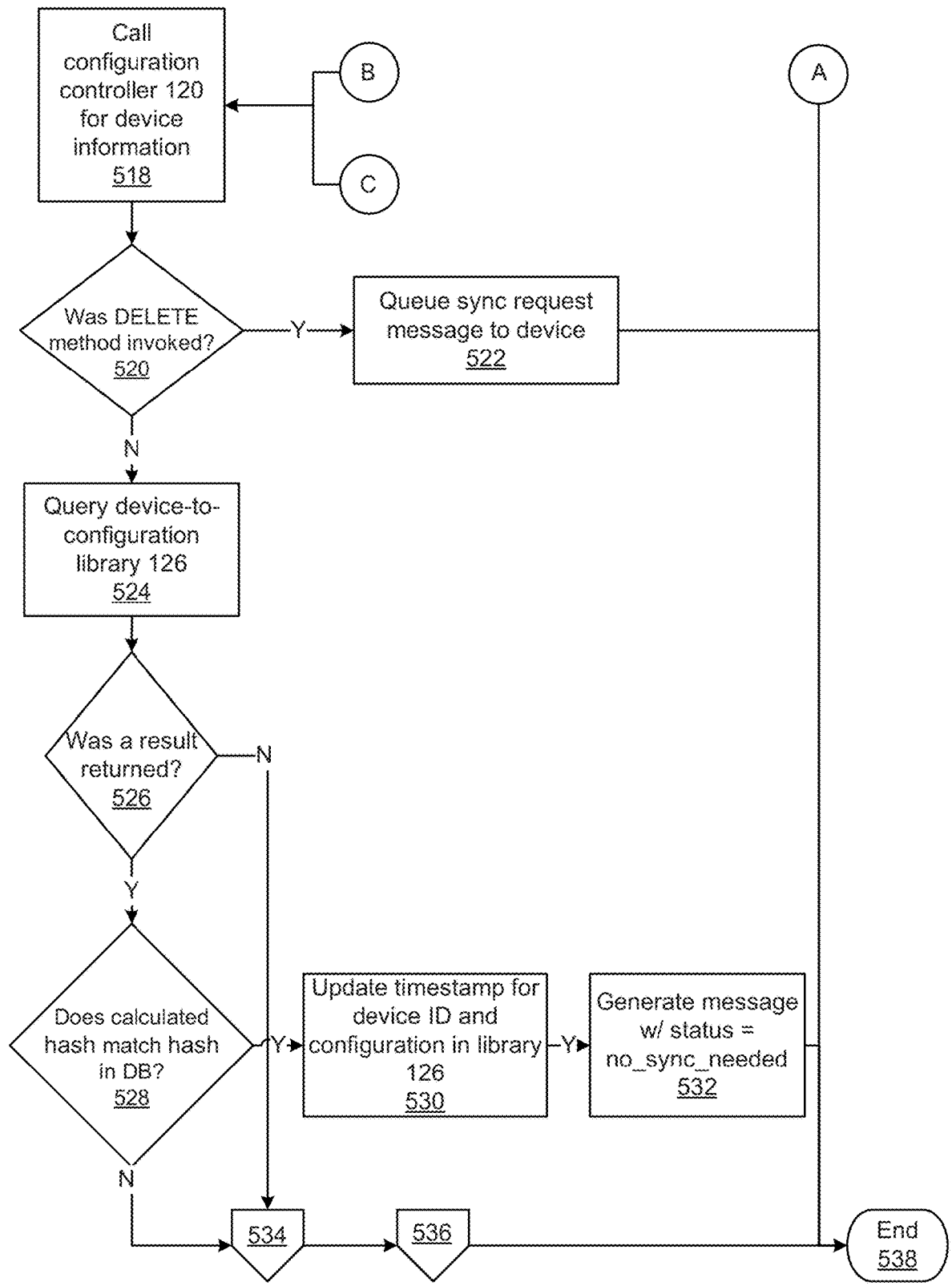

FIG. 5 illustrates a third party request flow to illustrate operation of the system 100, according to an example of the present disclosure.

The third party request flow may be utilized when a third party application requests that a new configuration is sent to or deleted from a device.

Referring to FIG. 5, at block 500, a third party may invoke the POST or DELETE method of a "Configuration File" application programming interface (API). In this regard, API parameters may include "file_type" that represents a configuration file type, "config_file" may represent the contents of a configuration itself, and "sha_1" may represent the hash algorithm used to verify a configuration file, if the configuration has been sent to the system 100 before.

At block 502, a determination may be made as to whether the hash sync process is on.

At block 504, based on a determination at block 502 that the hash sync process is not on, further processing may continue to a legacy configuration file management process.

At block 506, based on a determination at block 502 that the hash sync process is on, a determination may be made as to whether the configuration file type is supported by hash sync.

At block 508, based on a determination at block 506 that the configuration file type is supported by hash sync process, a determination may be made as to whether the aforementioned API is invoked with config_file.

With respect to blocks 510-514 discussed below, these blocks may represent a flow where the system 100 determines whether the configuration is new or existing. In this regard, if the system 100 has not seen the configuration before, the configuration will be saved to the application file system 128, and otherwise, the system 100 may use a copy that is already present in the application file system 128.

At block 510, based on a determination at block 508 that the API is invoked with config_file (the contents of the configuration file itself), the configuration file may be decoded for further processing (e.g., base64).

At block 512, the hash of the configuration file may be determined.

At block 514, the global configuration library 124, the device-to-configuration library 126, and the application file system 128 may be analyzed by the hash determined at block 512, and if the hash does not exist, it may be saved to the application file system 128.

At block 516, based on a determination at block 508 that the API is not invoked with config_file (the configuration file itself), the global configuration library 124 may be analyzed by the hash. If the hash exists in the global configuration library 124, then processing may continue, and otherwise, a third party configuration library may be called to retrieve the contents of the configuration file.

At block 518, the device configuration controller 120 may be called to retrieve additional information about the device. This information may be used after block 518 to send the configuration file to the device.

At block 520, a determination may be made as to whether a DELETE method was invoked for the Configuration File API. If the DELETE method was invoked by the third party, then the intent of the third party may be to remove the configuration file from the device.

At block 522, based on a determination at block 520 that the DELETE method was invoked, the sync request message may be queued to the device. This sync request message may request the device to delete the configuration file type from the device.

At block 524, based on a determination at block 520 that the DELETE method was not invoked, the device-to-configuration library 126 may be queried by device and file type in order to determine if a configuration file of that type already exists on the device.

At block 526, a determination may be made as to whether a result (e.g., from block 524) was returned. In this regard, a yes (Y) may indicate that a configuration file of that type has been queued before for the device, and a no (N) may indicate that the configuration file type has not been queued before for the device.

At block 528, a determination may be made as to whether the hash from block 512 matches the hash from the device-to-configuration library 126.

With respect to blocks 530-532 discussed below, these blocks may represent a flow where a third party is requesting to send a configuration that is already on the device. In this regard, the system 100 may update the 'last updated' timestamp and generate a reply successfully to the third party. Further, no information is queued for the device (since the device already has the configuration file).

At block 530, based on a determination at block 528 that the hash from block 512 matches the hash from the device-to-configuration library 126, a timestamp for the hash/device identification record may be updated in the device-to-configuration library 126.

At block 532, a 'sync status message' that informs third parties of the status of a configuration or a device may be generated, with a message status as "no_sync_needed".

Figure 9:
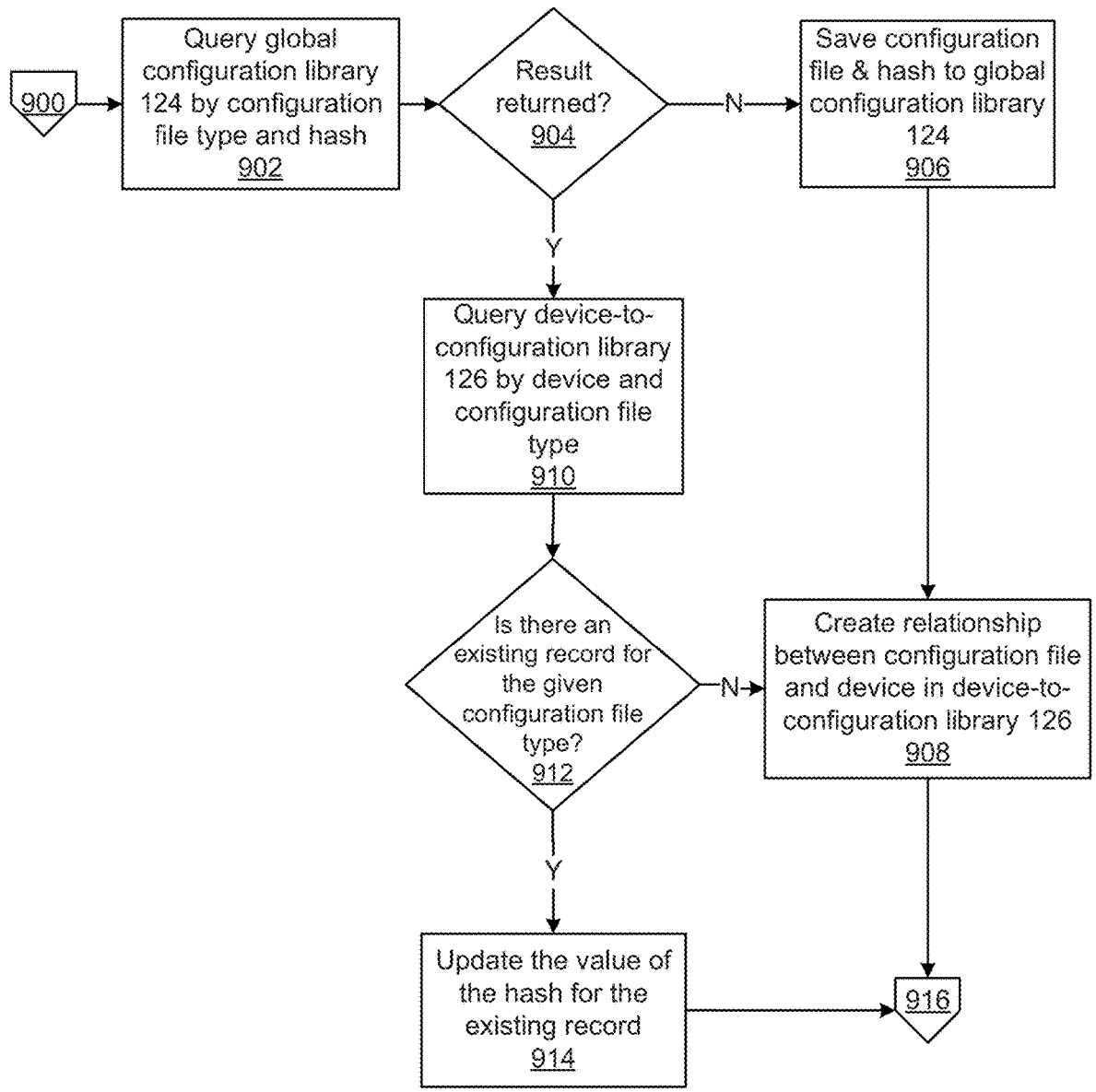
FIG. 9 illustrates a global file library-check sub-process flow to illustrate operation of the hash based device configuration management system of FIG. 1, according to an example of the present disclosure.

At block 534, further processing may proceed to the global configuration library 124 check flow of FIG. 9.

Figure 8:
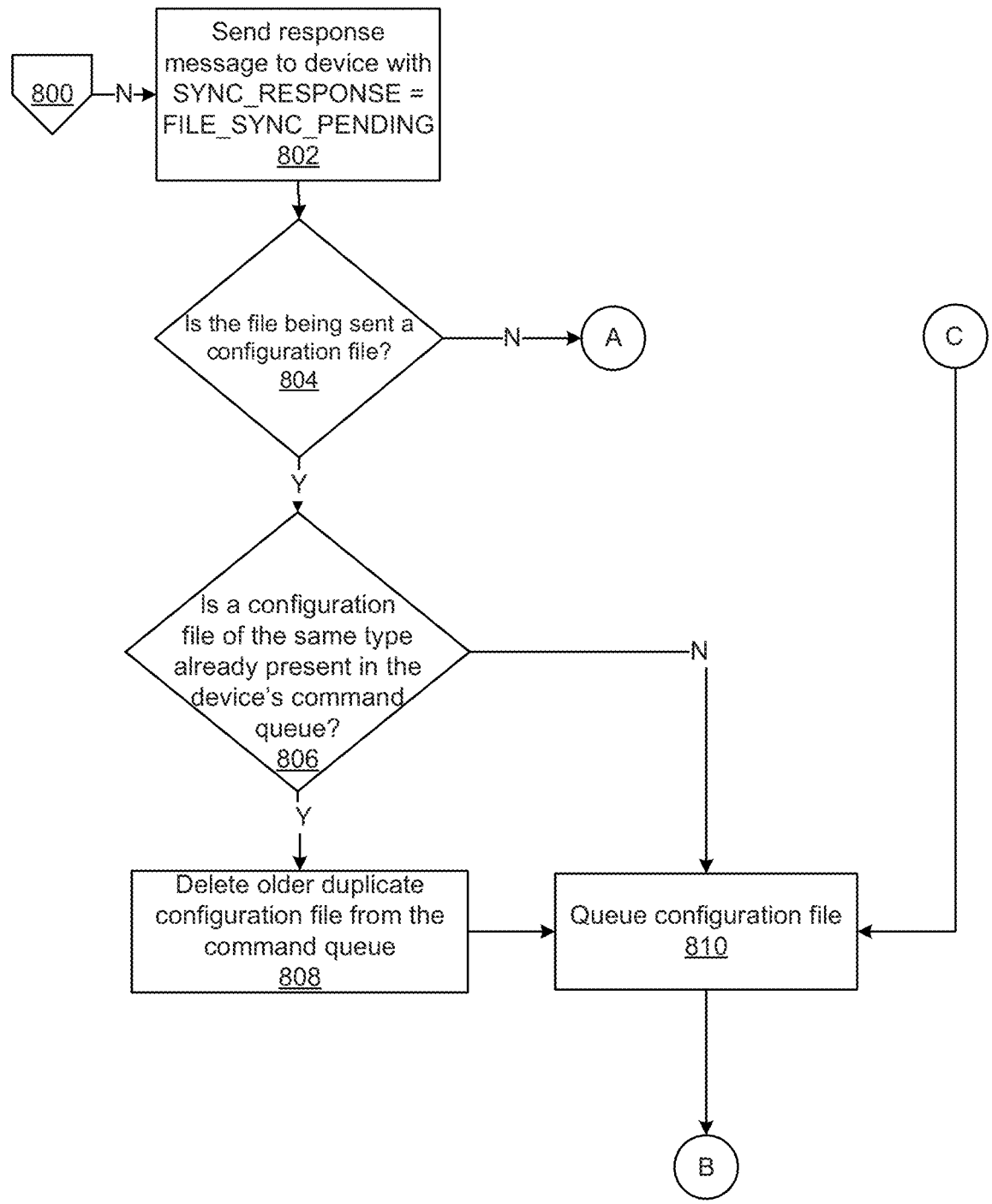
FIG. 8 illustrates a command queuing sub-process flow to illustrate operation of the hash based device configuration management system of FIG. 1, according to an example of the present disclosure.
Figure 8:
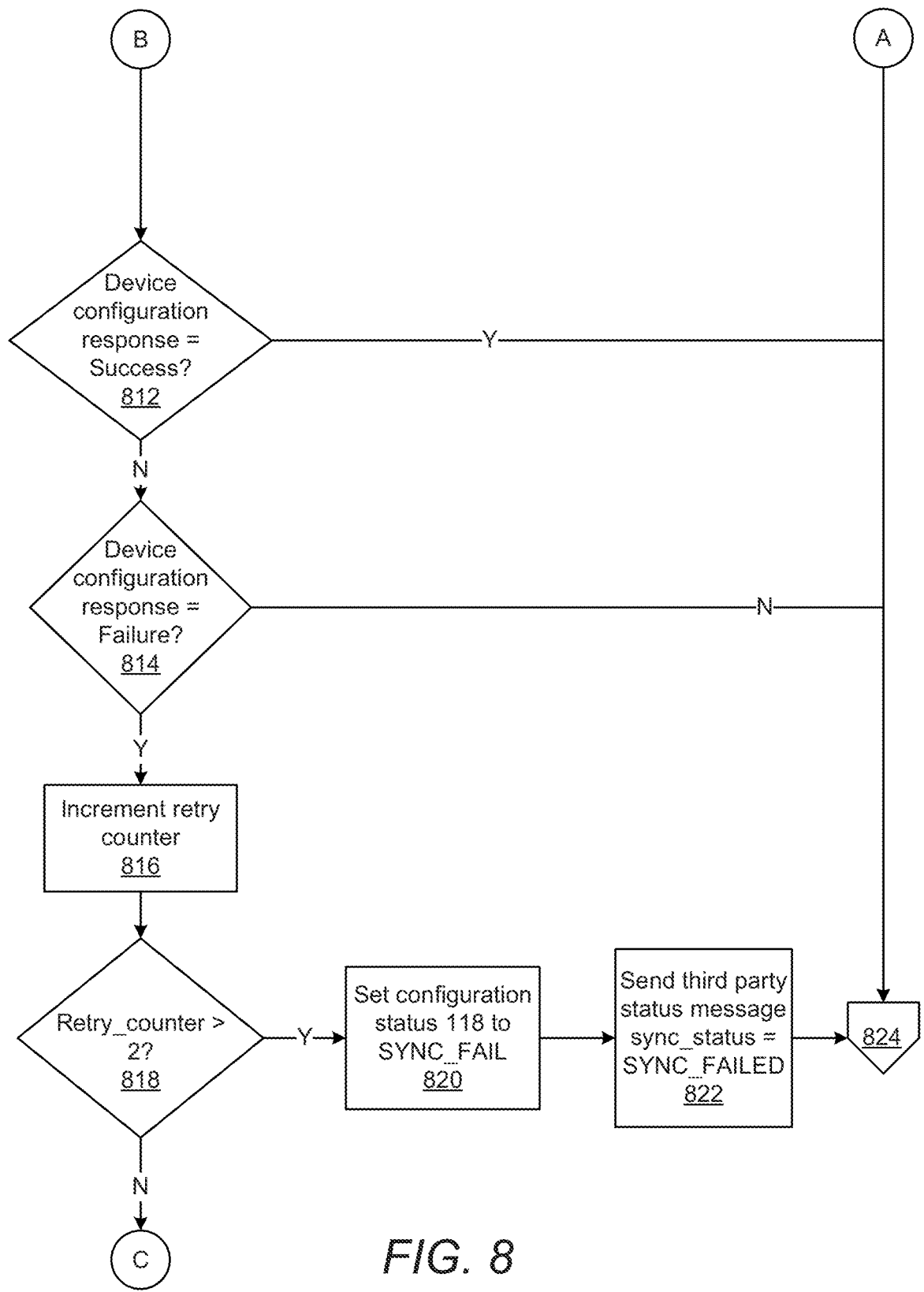

At block 536, further processing may proceed to the command queue flow of FIG. 8.

At block 538, processing with respect to the third party request flow may be completed.

Figure 6:
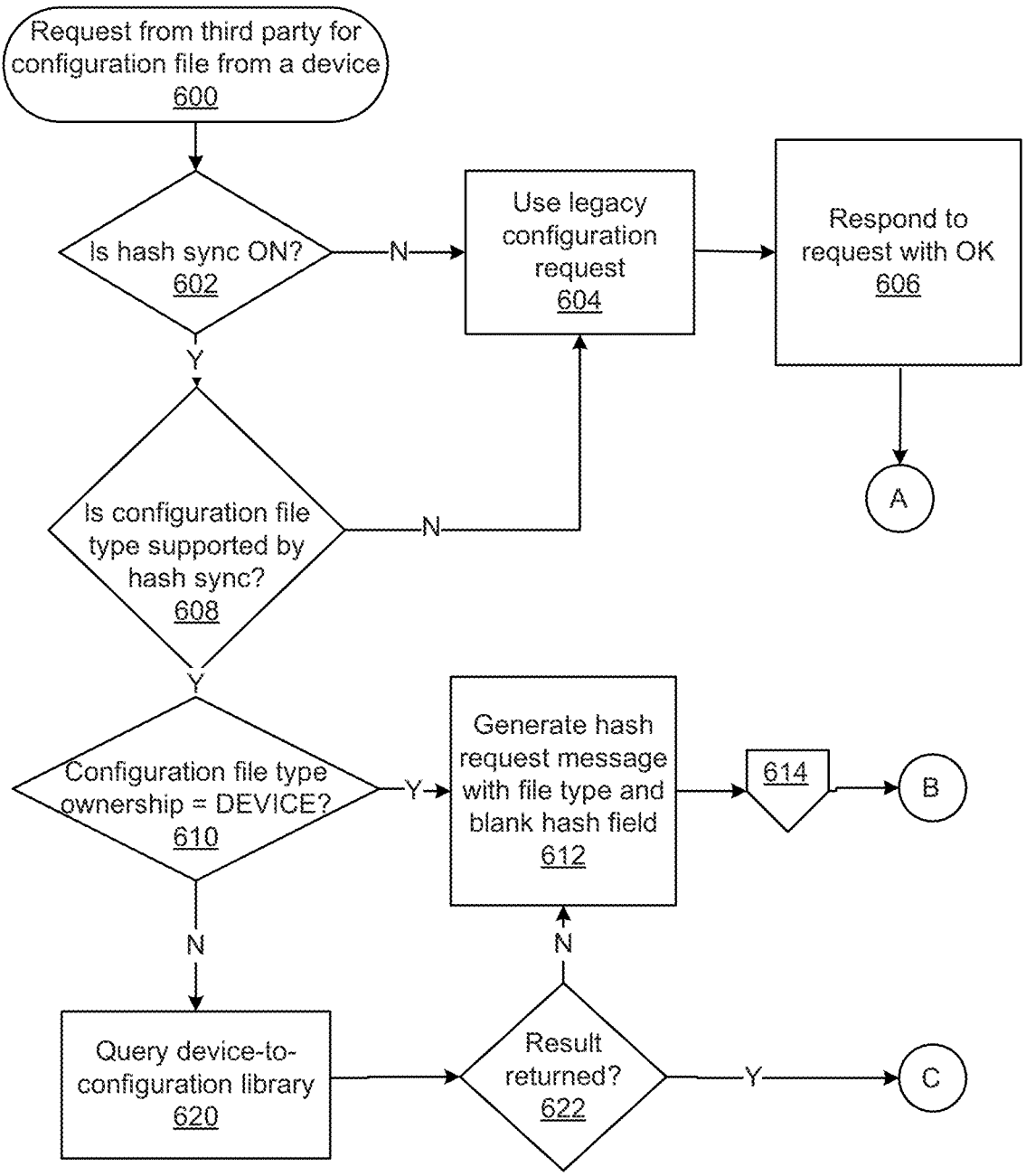
FIG. 6 illustrates a third party application request flow to illustrate operation of the hash based device configuration management system of FIG. 1, according to an example of the present disclosure.
Figure 6:
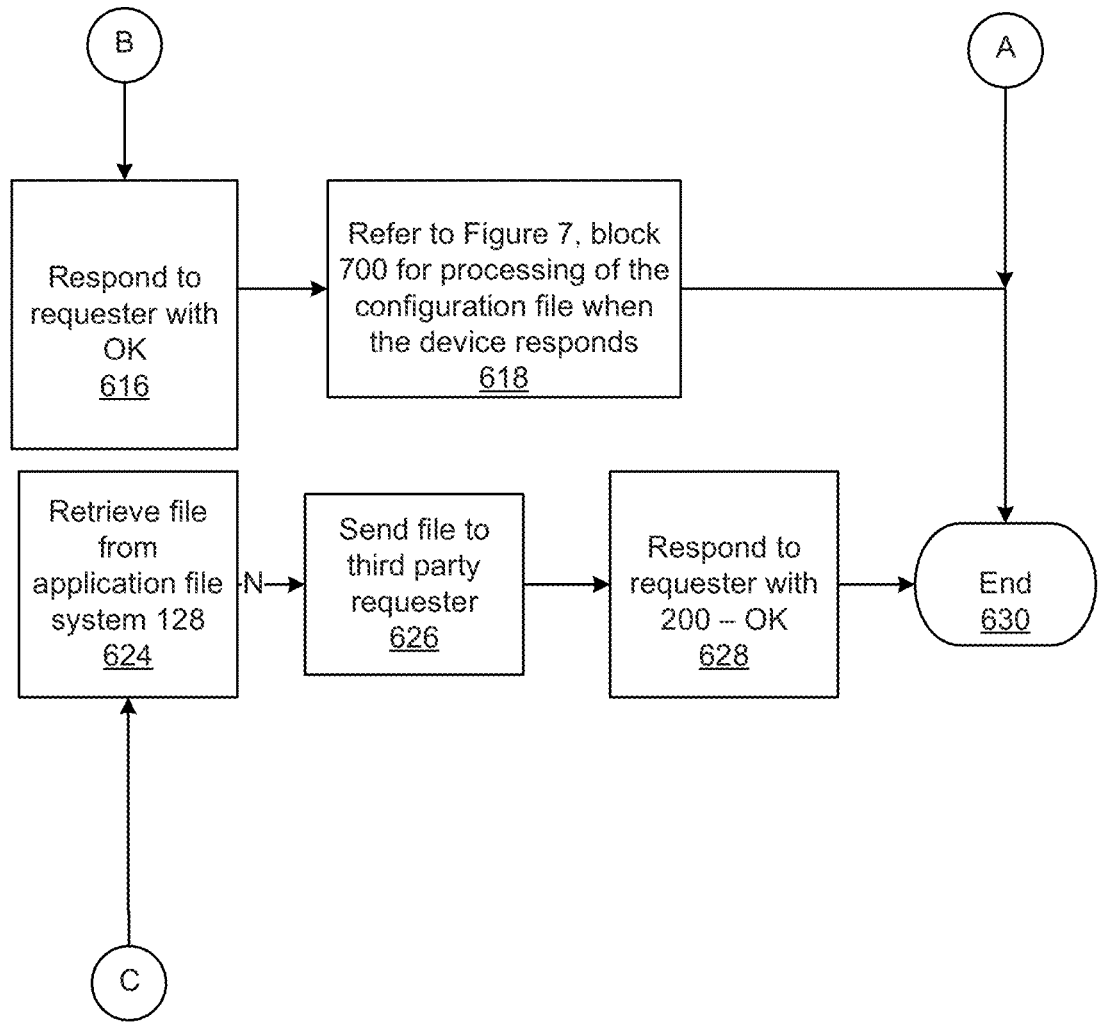

FIG. 6 illustrates a third party application request flow to illustrate operation of the system 100, according to an example of the present disclosure.

The third party application request flow may be utilized when a third party application requests a configuration file from the device. If the system 100 already knows which configuration files are on a device (from device-to-configuration library 126), the system 100 may reply with the system's copy (stored in file system 128) instead of requesting a new configuration file from the device.

Referring to FIG. 6, at block 600, a third party may request a configuration file from a device (e.g., device 108)

At block 602, a determination may be made as to whether the hash sync process is on.

At block 604, based on a determination at block 602 that the hash sync process is not on, a legacy configuration request process may be used.

At block 606, a response to the request with an "OK" may be generated.

At block 608, based on a determination at block 602 that the hash sync process is on, a determination may be made as to whether the configuration type is supported by the hash sync process.

With respect to blocks 610-618 discussed below, these blocks may represent a flow where a third party requests a configuration type which is owned by the device, and the system 100 automatically requests the configuration from the device.

At block 610, a determination may be made as to whether the configuration type being requested is owned by the device. If so, the configuration file may be requested directly from the device instead of using system 100's copy from the application file system 128.

At block 612, based on a determination at block 610 that a configuration file type is owned by the device, a hash request message may be generated with file type and a blank hash field. The blank hash field may prompt the device to send its copy of the configuration file to the system 100.

At block 614, a flow may be initiated with the request from block 612.

At block 616, a response may be generated to the requester with OK.

At block 618, further processing may proceed as disclosed herein with respect to FIG. 7, starting at block 700, when the device responds with the configuration file.

At block 620, a query may be made to the device-to-configuration library 126 to determine whether there is a record for the configuration file type for the device.

With respect to blocks 622-628 discussed below, these blocks may represent a flow where a third party requests a configuration file that the system 100 already has on record for the device. In this regard, the configuration file may be pulled from the system 100, and not requested from the device. Further, all responses to third parties and configuration file data may appear the same to integrating systems as if the file was requested from the device.

At block 622, a determination may be made as to whether a result is returned for the query at block 620.

At block 624, the configuration file may be retrieved from the application file system 128 by the hash.

At block 626, the configuration file may be sent to the third party requester At block 628, a response may be generated for the requester indicating "OK", thus communicating that the process was executed successfully.

At block 630, processing with respect to the application request flow may be completed.

FIG. 7 illustrates a device originated flow to illustrate operation of the system 100, according to an example of the present disclosure.

The device originated flow may be utilized when a device sends a configuration file to the system 100. This may occur if a configuration is applied at the device (whether valid or malicious) and sent to the system 100. It may also occur if a configuration file is requested from the device as a result of a third party request (e.g., see FIG. 6).

Referring to FIG. 7, at block 700, a device may send a configuration file to the system 100.

At block 702, a determination may be made as to whether the hash sync process is on.

At block 704, based on a determination at block 702 that the hash sync process is on, a determination may be made as to whether the configuration file type is supported by the hash sync process.

At block 706, based on a determination at block 704 that the configuration file type is supported by the hash sync process, a determination may be made as to whether the file type ownership is equal to DEVICE.

At block 708, based on a determination at block 706 that the configuration file type ownership is equal to DEVICE, the application file system 128 may be checked, and if the configuration file does not yet exist in the application file system 128, a save operation may be performed.

At block 710, further processing may proceed to the global file library-check sub-process flow of FIG. 9.

At block 712, a hash may be calculated for the configuration file sent by the device.

At block 714, the device-to-configuration library 126 may be queried by device and configuration type.

At block 716, a determination may be made as to whether a result is returned from the device-to-configuration library 126. In this regard, a yes (Y) may indicate that the system 100 and the device 108 both have a record for that configuration type, and a no (N) may indicate that the device has a configuration type that the system 100 does not have.

With respect to blocks 718-722 discussed below, these blocks may represent a flow where a device sends a configuration file to the system 100. If the configuration file is the same as recorded in system 100, no action is taken, but if the configuration file is different than expected, the system 100 may request the new configuration file from the device, so that system 100 may store a copy and update the application file system 128.

At block 718, the hash found in the device-to-configuration library 126 may be compared to the hash of the configuration file sent by the device. This is the configuration file sent by the device in block 700 and the hash calculated in block 712.

At block 720, a determination may be made as to whether the hash values match. If the values match, this may confirm that the device 108 and the system 100 are in sync, and no action is needed. If the values do not match, this may mean that a configuration file was somehow applied to the device, but the device does not own that configuration type (as determined in block 706). The system 100 may then re-synchronize with the device by sending it the configuration file that the system 100 has on that device.

At block 722, based on a determination at block 720 that the hash values do not match, the existing configuration file found in the device-to-configuration library 126 may be retrieved from the application file system 128.

At block 724, the configuration file retrieved in block 722 may be sent to the device so that the device is in sync with the system 100

At block 726, further processing may proceed to the global file library-check sub-process flow of FIG. 9.

At block 728, processing with respect to the device originated flow may be completed.

FIG. 8 illustrates a command queuing sub-process flow to illustrate operation of the system 100, according to an example of the present disclosure.

The command queuing sub-process flow may provide for sending of the configuration file for the device, and include retry logic associated with that command if the command fails on the first or second attempt.

Referring to FIG. 8, at block 800, processing with respect to the command queuing sub-process flow may commence.

At block 802, an hash response message may be generated with "SYNC_RESPONSE=FILE_SYNC_PENDING", which may notify the device that system 100 will be sending a configuration file.

At block 804, a determination may be made as to whether the file type being queued is a configuration file. This may ensure that the sync response message types are not processed the same manner as the configuration file types.

With respect to blocks 806-818 discussed below, these blocks may represent a flow of the logic for queuing a configuration file, as well as the retry logic for re-queuing the configuration if it fails at the device.

At block 806, a determination may be made as to whether a configuration file of the same type is already present in the device's command queue.

At block 808, the older duplicate configuration file type may be deleted from the command queue.

At block 810, the configuration file may be queued.

At block 812, further to block 810, a determination may be made as to whether a device acknowledges that the configuration file was successfully downloaded and applied.

At block 814, based on a determination at block 812 that the command response is not successful, the command status may be set to failure before trying to re-queue the configuration file a second or third time (proceeding through transition point 'C')

At block 816, the retry counter may be incremented.

At block 818, a determination may be made as to whether the retry counter is greater than two, or another specified value. If the retry counter is less than two, processing may revert to block 810.

At block 820, based on a determination that the retry counter is greater than two, sync_status in application configuration status 118 may be set to SYNC_FAIL since all retries have failed and the process must end.

At block 822, a sync_status=SYNC_FAIL message may be generated to notify third party applications that the hash sync process has failed for the device At block 824, processing with respect to the command queuing sub-process flow may be completed.

FIG. 9 illustrates a global file library-check sub-process flow to illustrate operation of the system 100, according to an example of the present disclosure.

The global file library-check sub-process flow may include the logic for utilization of the global file library to determine whether the process flow is encountering a new configuration file or an existing configuration file.

Referring to FIG. 9, the logic of FIG. 9 may represent a reusable piece of logic to analyze the global configuration library 124. In this regard, the outcome of the check may be either that the device-to-configuration library 126 is updated or the configuration does not exist at all, and thus a new global configuration library 124 record may be created and the relationship may be established.

At block 900, processing with respect to the global configuration library 124 may commence.

At block 902, the global configuration library 124 may be queried by configuration file type and hash value (e.g., the device configuration hash value 110)

At block 904, a determination may be made as to whether a result is returned. If a result is returned, the configuration file may have been sent to or from the system 100 in the past. If no record is returned, the configuration file may be determined to be completely new to the system 100.

At block 906, based on a determination at block 904 that a result is not returned, the configuration file type and hash value may be saved to the global configuration library 124 so that it may be referenced and used in the future if it is sent to or from another device.

At block 908, a relationship may be created between the configuration file and the device in the device-to-configuration library 126.

At block 910, based on a determination at block 904 that a result is returned, the device-to-configuration library 126 may be queried by configuration file type and device to determine if there is already a record of that configuration file type for that device.

At block 912, with respect to the record from block 910, a determination may be made as to whether there is an existing file type for the given device.

At block 914, the value of the hash may be updated for the given device and configuration type. This may represent that the device has a new version of a previously existing configuration type.

At block 916, processing with respect to the global configuration library 124 may be completed.

Figure 10:
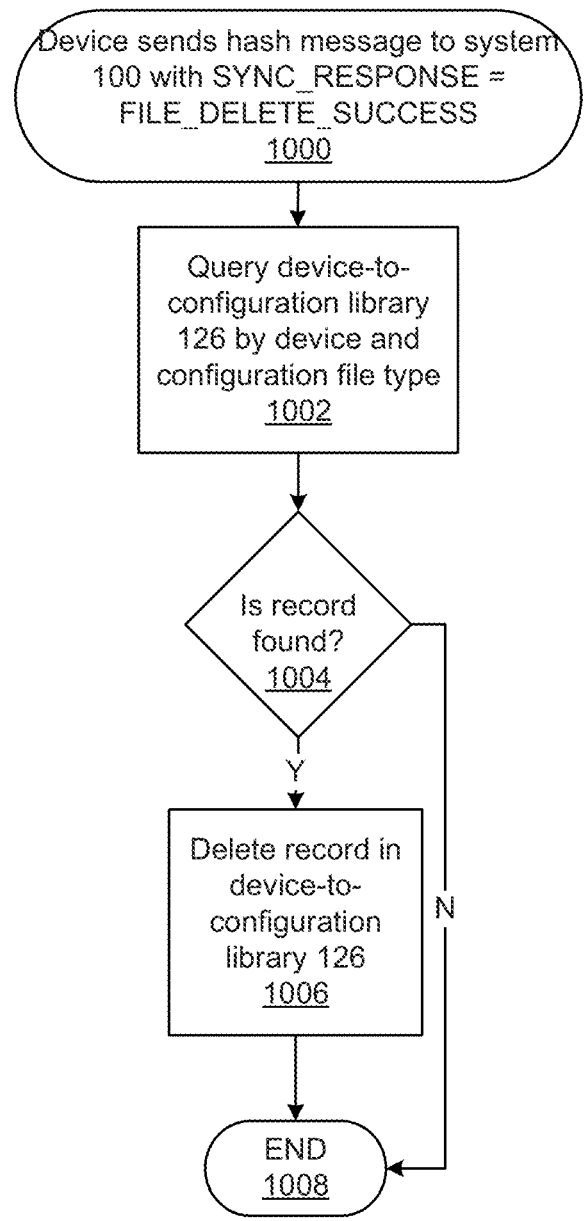
FIG. 10 illustrates a device initiated delete flow to illustrate operation of the hash based device configuration management system of FIG. 1, according to an example of the present disclosure.

FIG. 10 illustrates a device initiated delete flow to illustrate operation of the system 100, according to an example of the present disclosure.

The device initiated delete flow may be utilized by a device to handle a configuration file when the configuration file is deleted locally, and the system 100 is to be updated of this change. If the local-delete is not permitted, the system 100 may rectify the situation by re-queuing the configuration file that the device is trying to delete.

Referring to FIG. 10, the logic of FIG. 10 may be used when a device requests the system 100 to delete a configuration record (as long as the device has permissions to do so for that configuration type).

At block 1000, a device may send an hash response message with SYNC_RESPONSE=FILE_DELETE_SUCCESS.

At block 1002, the device-to-configuration library 126 may be queried by device and configuration file type.

At block 1004, a determination may be made as to whether a record is found.

At block 1006, based on a determination at block 1004 that a record is found, the record may be deleted.

At block 1008, processing with respect to the device initiated delete flow may be completed.

Figure 11:
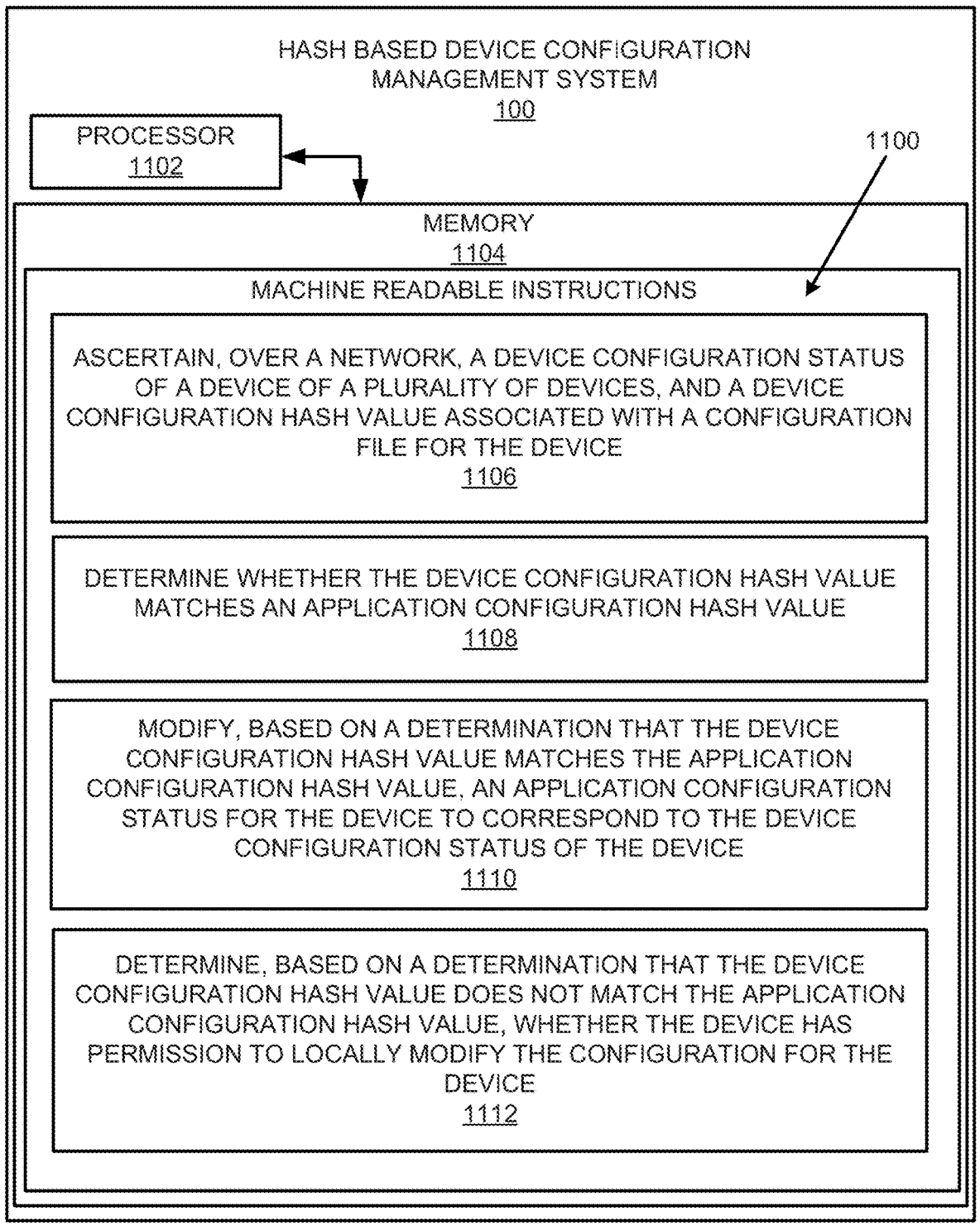
FIG. 11 illustrates a block diagram for hash based device configuration management, according to an example of the present disclosure.
Figure 11:
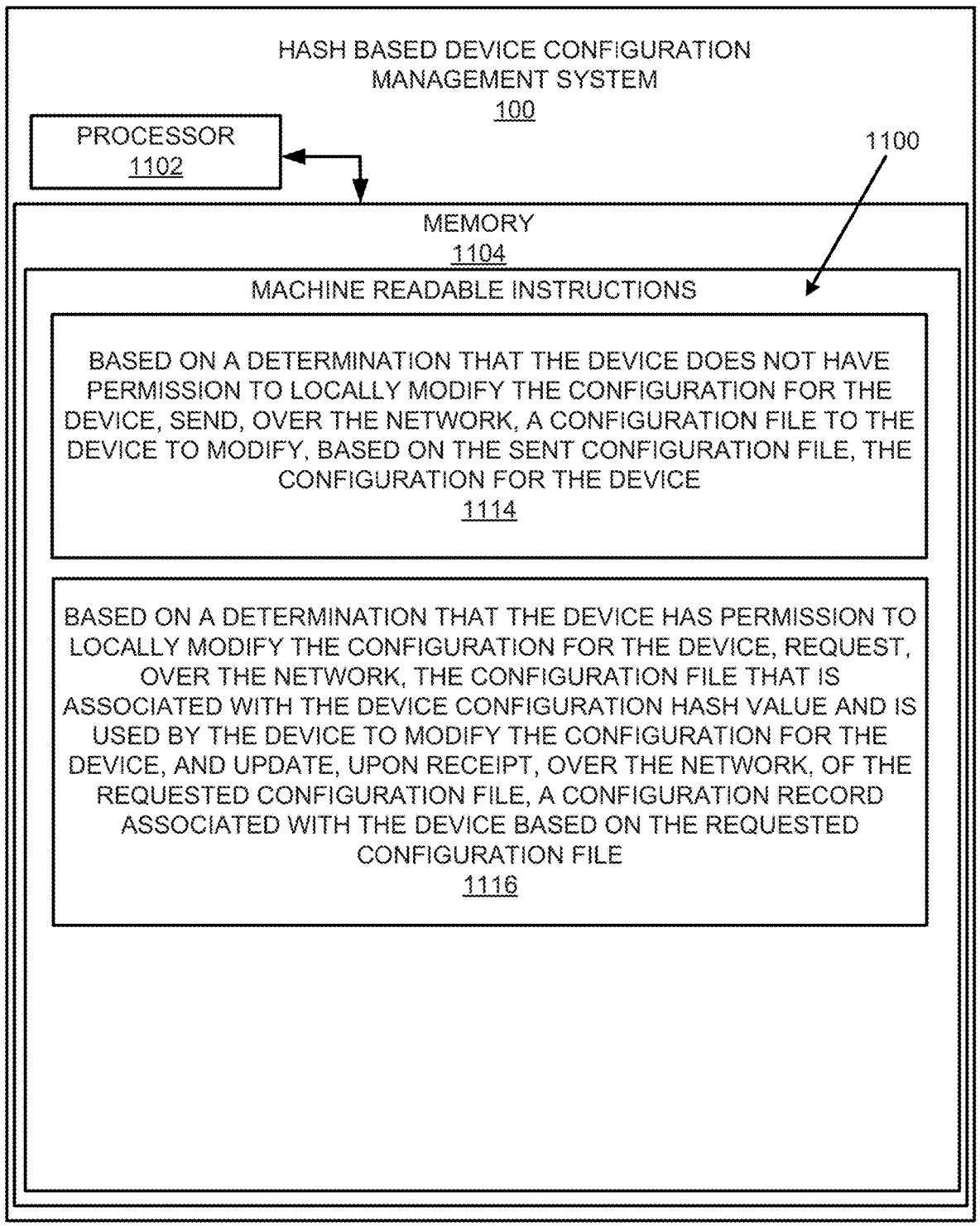
Figure 13:
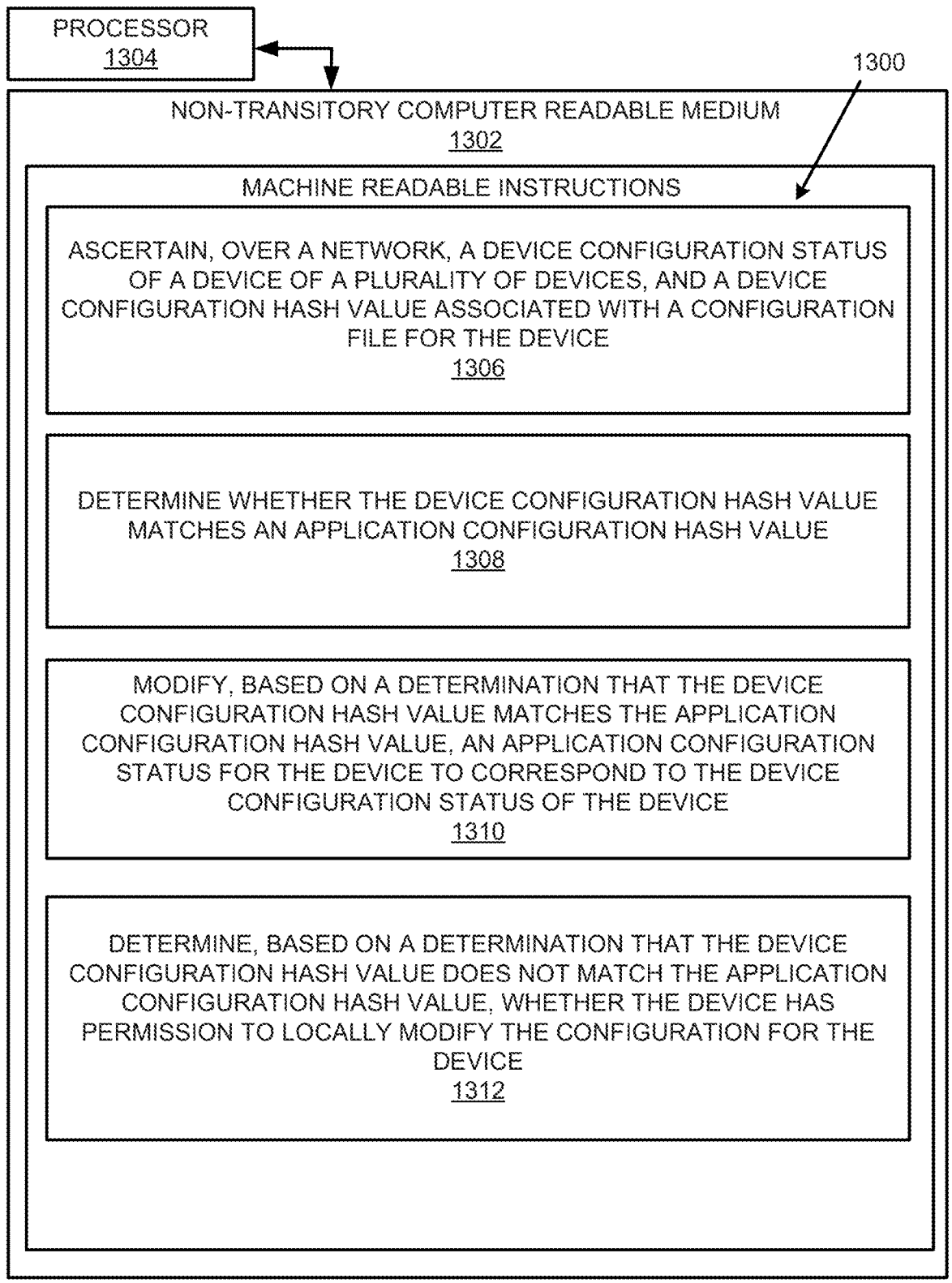
FIG. 13 illustrates a further block diagram for hash based device configuration management, according to an example of the present disclosure.
Figure 13:
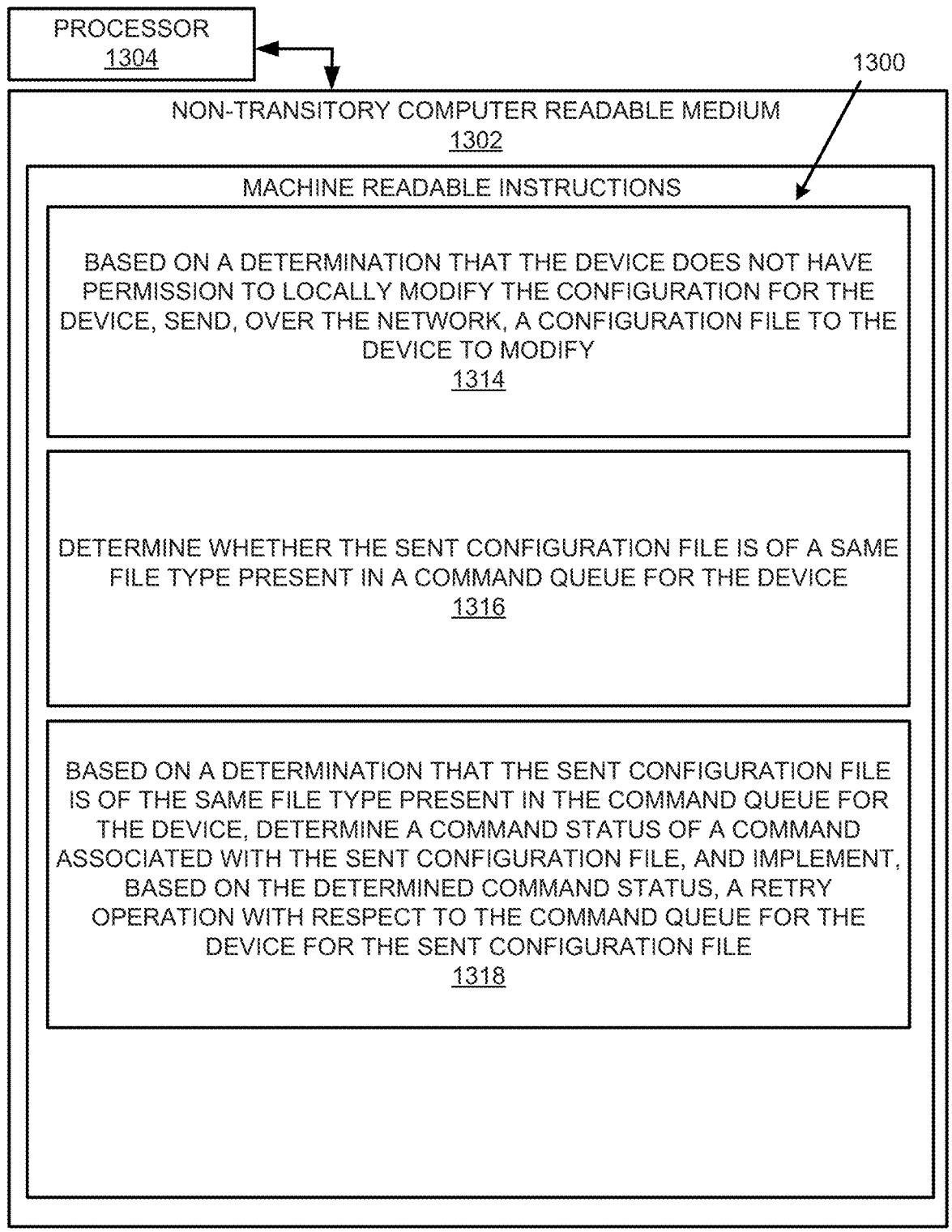

FIGS. 11-13 respectively illustrate a block diagram 1100, a flowchart of a method 1200, and a further block diagram 1300 for hash based device configuration management, according to examples. The block diagram 1100, the method 1200, and the block diagram 1300 may be implemented on the system 100 described above with reference to FIG. 1 by way of example and not limitation. The block diagram 1100, the method 1200, and the block diagram 1300 may be practiced in other systems. In addition to showing the block diagram 1100, FIG. 11 shows hardware of the system 100 that may execute the instructions of the block diagram 1100. The hardware may include a processor 1102, and a memory 1104 storing machine readable instructions that when executed by the processor cause the processor to perform the instructions of the block diagram 1100. The memory 1104 may represent a non-transitory computer readable medium. FIG. 12 may represent a method for implementing a hash based device configuration management, and the steps of the method. FIG. 13 may represent a non-transitory computer readable medium 1302 having stored thereon machine readable instructions to provide a hash based device configuration management. The machine readable instructions, when executed, cause a processor 1304 to perform the instructions of the block diagram 1300 also shown in FIG. 13.

The processor 1102 of FIG. 11 and/or the processor 1304 of FIG. 13 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1302 of FIG. 13), such as hardware storage devices (e.g., RAM (random access memory), ROM (read only memory), EPROM (erasable, programmable ROM), EEPROM (electrically erasable, programmable ROM), hard drives, and flash memory). The memory 1104 may include a RAM, where the machine readable instructions and data for a processor may reside during runtime.

Referring to FIGS. 1-11, and particularly to the block diagram 1100 shown in FIG. 11, the memory 1104 may include instructions 1106 to ascertain, over a network 104, a device configuration status 106 of a device 108 of a plurality of devices, and a device configuration hash value 110 associated with a configuration file 112 for the device 108.

The processor 1102 may fetch, decode, and execute the instructions 1108 to determine whether the device configuration hash value 110 matches an application configuration hash value 114.

The processor 1102 may fetch, decode, and execute the instructions 1110 to modify, based on a determination that the device configuration hash value 110 matches the application configuration hash value 114, an application configuration status 118 for the device 108 to correspond to the device configuration status 106 of the device 108.

The processor 1102 may fetch, decode, and execute the instructions 1112 to determine, based on a determination that the device configuration hash value 110 does not match the application configuration hash value 114, whether the device 108 has permission to locally modify the configuration for the device 108.

Based on a determination that the device 108 does not have permission to locally modify the configuration for the device 108, the processor 1102 may fetch, decode, and execute the instructions 1114 to send, over the network 104, a configuration file to the device 108 to modify, based on the sent configuration file, the configuration for the device 108.

Based on a determination that the device 108 has permission to locally modify the configuration for the device 108, the processor 1102 may fetch, decode, and execute the instructions 1116 to request, over the network 104, the configuration file that is associated with the device configuration hash value 110 and is used by the device 108 to modify the configuration for the device 108, and update, upon receipt, over the network 104, of the requested configuration file, a configuration record 122 associated with the device 108 based on the requested configuration file.

Referring to FIGS. 1-10 and 12, and particularly FIG. 12, for the method 1200, at block 1202, the method may include ascertaining, over a network 104, a device configuration status 106 of a device 108 of a plurality of devices that include Internet of Things (IoT) devices, and a device configuration hash value 110 associated with a configuration file 112 for the device 108.

At block 1204, the method may include determining whether the device configuration hash value 110 matches an application configuration hash value 114.

At block 1206, the method may include modifying, based on a determination that the device configuration hash value 110 matches the application configuration hash value 114, an application configuration status 118 for the device 108 to correspond to the device configuration status 106 of the device 108.

At block 1208, the method may include determining, based on a determination that the device configuration hash value 110 does not match the application configuration hash value 114, whether the device 108 has permission to locally modify the configuration for the device 108.

At block 1210, based on a determination that the device 108 does not have permission to locally modify the configuration for the device 108, the method may include sending, over the network 104, a configuration file to the device 108 to modify, based on the sent configuration file, the configuration for the device 108.

At block 1212, based on a determination that the device 108 has permission to locally modify the configuration for the device 108, the method may include requesting, over the network 104, the configuration file that is associated with the device configuration hash value 110 and is used by the device 108 to modify the configuration for the device 108, and updating, upon receipt, over the network 104, of the requested configuration file, a configuration record 122 associated with the device 108 based on the requested configuration file.

Referring to FIGS. 1-10 and 13, and particularly FIG. 13, for the block diagram 1300, the non-transitory computer readable medium 1302 may include instructions 1306 to ascertain, over a network 104, a device configuration status 106 of a device 108 of a plurality of devices, and a device configuration hash value 110 associated with a configuration file 112 for the device 108.

The processor 1304 may fetch, decode, and execute the instructions 1308 to determine whether the device configuration hash value 110 matches an application configuration hash value 114.

The processor 1304 may fetch, decode, and execute the instructions 1310 to modify, based on a determination that the device configuration hash value 110 matches the application configuration hash value 114, an application configuration status 118 for the device 108 to correspond to the device configuration status 106 of the device 108.

The processor 1304 may fetch, decode, and execute the instructions 1312 to determine, based on a determination that the device configuration hash value 110 does not match the application configuration hash value 114, whether the device 108 has permission to locally modify the configuration for the device 108.

Based on a determination that the device 108 does not have permission to locally modify the configuration for the device 108, the processor 1304 may fetch, decode, and execute the instructions 1314 to send, over the network 104, a configuration file to the device 108 to modify, based on the sent configuration file, the configuration for the device 108.

The processor 1304 may fetch, decode, and execute the instructions 1316 to determine whether the sent configuration file is of a same file type present in a command queue for the device 108.

Based on a determination that the sent configuration file is of the same file type present in the command queue for the device 108, the processor 1304 may fetch, decode, and execute the instructions 1318 to determine a command status of a command associated with the sent configuration file, and implement, based on the determined command status, a retry operation with respect to the command queue for the device 108 for the sent configuration file.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A system comprising:
 a device configuration analyzer, executed by at least one hardware processor, to
  ascertain, over a network,
   a device configuration status of a device of a plurality of devices, and
   a device configuration hash value associated with a configuration file for the device, and
  determine whether the device configuration hash value matches an application configuration hash value;
 a device configuration status controller, executed by the at least one hardware processor, to
  modify, based on a determination that the device configuration hash value matches the application configuration hash value, an application configuration status for the device to correspond to the device configuration status of the device; and
 a device configuration controller, executed by the at least one hardware processor, to
  determine, based on a determination that the device configuration hash value does not match the application configuration hash value, whether the device has permission to locally modify the configuration for the device,
  based on a determination that the device does not have permission to locally modify the configuration for the device, send, over the network, a configuration file to the device to modify, based on the sent configuration file, the configuration for the device, and
  based on a determination that the device has permission to locally modify the configuration for the device,
   request, over the network, the configuration file that is associated with the device configuration hash value and is used by the device to modify the configuration for the device, and
   update, upon receipt, over the network, of the requested configuration file, a configuration record associated with the device based on the requested configuration file.

2. The system according to claim 1, wherein
 the device configuration hash value is a Secure Hash Algorithm 1 hash, and
 the application configuration hash value is Secure Hash Algorithm 1.

3. The system according to claim 1, wherein the device includes an Internet of Things (IoT) device.

4. The system according to claim 1, wherein the device configuration analyzer is to:
 further to the sending, over the network, the configuration file to the device to modify, based on the sent configuration file, the configuration for the device,
 ascertain, from the device and over the network,
  the device configuration status of the device, and
  the device configuration hash value associated with the configuration file that is used to modify the configuration for the device; and
 determine whether the device configuration hash value associated with the configuration file that is used to modify the configuration for the device matches the application configuration hash value.

5. The system according to claim 1, wherein the device configuration analyzer is to determine whether the device configuration hash value matches the application configuration hash value by
 accessing, over the network, a global configuration library that
  stores application configuration hash values including the application configuration hash value, wherein the application configuration hash values are mapped to associated configuration files,
 accessing, over the network, a device-to-configuration library that
  stores a reference to the global configuration library for each configuration file on a device, and
 ascertaining, based on the access to the global configuration library and the device-to-configuration library, the application configuration hash value associated with the device for which the device configuration hash value is ascertained.

6. The system according to claim 1, wherein the device configuration controller is to:
 ascertain, over the network, a request to update the configuration for the device;
 ascertain, over the network, another device configuration hash value associated with the request to update the configuration for the device;
 retrieve, over the network, a configuration file associated with the another device configuration hash value; and
 send, to the device and over the network, the retrieved configuration file associated with the another device configuration hash value to update the configuration for the device.

7. The system according to claim 6, wherein the device configuration analyzer is to:
 notify, over the network, an entity associated with the request to update the configuration for the device, the device configuration status of the device upon completion of the update, based on the retrieved configuration file associated with the another device configuration hash value, of the configuration for the device.

8. The system according to claim 1, wherein the device configuration analyzer is to:
 receive, over the network, a request from an entity for the configuration file that is used by the device;

determine, based on the received request from the entity for the configuration file that is used by the device, whether the configuration file that is used by the device is known or unknown; and based on a determination that the configuration file that is used by the device is known, generate, for the entity, a response that includes an indication of the configuration file that is used by the device.

9. The system according to claim 8, wherein the device configuration analyzer is to:

based on a determination that the configuration file that is used by the device is unknown, ascertain, from the device, the configuration file that is used by the device; and generate, for the entity, a response that includes an indication of the ascertained configuration file that is used by the device.

10. The system according to claim 1, wherein the device configuration analyzer is to:

further to the sending, over the network, the configuration file to the device to modify, based on the sent configuration file, the configuration for the device,
determine whether the sent configuration file is of a same file type present in a command queue for the device, and
based on a determination that the sent configuration file is of the same file type present in the command queue for the device,
determine a command status of a command associated with the sent configuration file, and
implement, based on the determined command status, a retry operation with respect to the command queue for the device for the sent configuration file.

11. The system according to claim 1, wherein the device configuration analyzer is to:

further to the sending, over the network, the configuration file to the device to modify, based on the sent configuration file, the configuration for the device,
determine whether the sent configuration file is of a same file type present in a command queue for the device, and
based on a determination that the sent configuration file is not of the same file type present in the command queue for the device, implement a retry operation with respect to the command queue for the device for the sent configuration file.

12. A computer implemented method comprising:
ascertaining, over a network,
a device configuration status of a device of a plurality of devices that include Internet of Things (IoT) devices, and
a device configuration hash value associated with a configuration file for the device;
determining whether the device configuration hash value matches an application configuration hash value;
modifying, based on a determination that the device configuration hash value matches the application configuration hash value, an application configuration status for the device to correspond to the device configuration status of the device;
determining, based on a determination that the device configuration hash value does not match the application configuration hash value, whether the device has permission to locally modify the configuration for the device;
based on a determination that the device does not have permission to locally modify the configuration for the device, sending, over the network, a configuration file to the device to modify, based on the sent configuration file, the configuration for the device; and based on a determination that the device has permission to locally modify the configuration for the device,
requesting, over the network, the configuration file that is associated with the device configuration hash value and is used by the device to modify the configuration for the device, and
updating, upon receipt, over the network, of the requested configuration file, a configuration record associated with the device based on the requested configuration file.

13. The method according to claim 12, wherein
the device configuration hash value is a Secure Hash Algorithm 1 value, and
the application configuration hash value is Secure Hash Algorithm 1.

14. The method according to claim 12, further comprising:

further to the sending, over the network, the configuration file to the device to modify, based on the sent configuration file, the configuration for the device,
ascertaining, from the device and over the network,
the device configuration status of the device, and
the device configuration hash value associated with the configuration file that is used to modify the configuration for the device; and
determining whether the device configuration hash value associated with the configuration file that is used to modify the configuration for the device matches the application configuration hash value.

15. The method according to claim 12, wherein determining whether the device configuration hash value matches the application configuration hash value further comprises:

accessing, over the network, a global configuration library that
stores application configuration hash values including the application configuration hash value, wherein the application configuration hash values are mapped to associated configuration files;
accessing, over the network, a device-to-configuration library that
stores a reference to the global configuration library for each configuration file on a device; and
ascertaining, based on the access to the global configuration library and the device-to-configuration library, the application configuration hash value associated with the device for which the device configuration hash value is ascertained.

16. A non-transitory computer readable medium having stored thereon machine readable instructions, the machine readable instructions, when executed, cause at least one hardware processor to:

ascertain, over a network,
a device configuration status of a device of a plurality of devices, and
a device configuration hash value associated with a configuration file for the device;
determine whether the device configuration hash value matches an application configuration hash value;
modify, based on a determination that the device configuration hash value matches the application configuration hash value, an application configuration status for the device to correspond to the device configuration status of the device;

determine, based on a determination that the device configuration hash value does not match the application configuration hash value, whether the device has permission to locally modify the configuration for the device; and based on a determination that the device does not have permission to locally modify the configuration for the device,
- send, over the network, a configuration file to the device to modify, based on the sent configuration file, the configuration for the device,
- determine whether the sent configuration file is of a same file type present in a command queue for the device, and
- based on a determination that the sent configuration file is of the same file type present in the command queue for the device,
  - determine a command status of a command associated with the sent configuration file, and
  - implement, based on the determined command status, a retry operation with respect to the command queue for the device for the sent configuration file.

17. The non-transitory computer readable medium according to claim 16, wherein the machine readable instructions when executed by the at least one hardware processor further cause the at least one hardware processor to:

based on a determination that the device has permission to locally modify the configuration for the device,
- request, over the network, the configuration file that is associated with the device configuration hash value and is used by the device to modify the configuration for the device, and
- update, upon receipt, over the network, of the requested configuration file, a configuration record associated with the device based on the requested configuration file.

18. The non-transitory computer readable medium according to claim 16, wherein the machine readable instructions when executed by the at least one hardware processor further cause the at least one hardware processor to:
- ascertain, over the network, a request to update the configuration for the device;
- ascertain, over the network, another device configuration hash value associated with the request to update the configuration for the device;
- retrieve, over the network, a configuration file associated with the another device configuration hash value; and
- send, to the device and over the network, the retrieved configuration file associated with the another device configuration hash value to update the configuration for the device.

19. The non-transitory computer readable medium according to claim 18, wherein the machine readable instructions when executed by the at least one hardware processor further cause the at least one hardware processor to:
- notify, over the network, an entity associated with the request to update the configuration for the device, the device configuration status of the device upon completion of the update, based on the retrieved configuration file associated with the another device configuration hash value, of the configuration for the device.

20. The non-transitory computer readable medium according to claim 16, wherein the machine readable instructions when executed by the at least one hardware processor further cause the at least one hardware processor to:
- receive, over the network, a request from an entity for the configuration file that is used by the device;
- determine, based on the received request from the entity for the configuration file that is used by the device, whether the configuration file that is used by the device is known or unknown; and
- based on a determination that the configuration file that is used by the device is known, generate, for the entity, a response that includes an indication of the configuration file that is used by the device.

* * * * *